(12) United States Patent
Shimasaki

(10) Patent No.: US 8,729,743 B2
(45) Date of Patent: May 20, 2014

(54) COUPLER APPARATUS

(75) Inventor: Hiroshi Shimasaki, Kunitachi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 497 days.

(21) Appl. No.: 13/169,723

(22) Filed: Jun. 27, 2011

(65) Prior Publication Data

US 2012/0007440 A1 Jan. 12, 2012

(30) Foreign Application Priority Data

Jul. 9, 2010 (JP) .................. 2010-157282

(51) Int. Cl.
*H01B 7/30* (2006.01)

(52) U.S. Cl.
USPC ........................................ 307/147

(58) Field of Classification Search
USPC ........................................ 307/147
See application file for complete search history.

(56) References Cited

U.S. PATENT DOCUMENTS

| 7,358,906 B2 | 4/2008 | Sato et al. |
| 2005/0153756 A1 | 7/2005 | Sato et al. |

FOREIGN PATENT DOCUMENTS

| JP | 2005-203878 | 7/2005 |
| JP | 2006-013878 | 1/2006 |
| JP | 2009-010453 | 1/2009 |

*Primary Examiner* — Robert L. Deberadinis
(74) *Attorney, Agent, or Firm* — Knobbe Martens Olson & Bear LLP

(57) ABSTRACT

In one embodiment, a coupler apparatus includes a monopole type coupling element, a parasitic element, and a ground plane. The coupling element includes a conductive material and subjects to power feeding to a feeding point. The parasitic element includes a conductive material. The parasitic element is arranged to be apart from the coupling element, and grounded. The ground plane includes a conductive material. The ground plane faces the coupling element and the parasitic element. The ground plane is cut out at a position where it faces at least a part of a portion other than the feeding point in the coupling element or near this position.

18 Claims, 18 Drawing Sheets

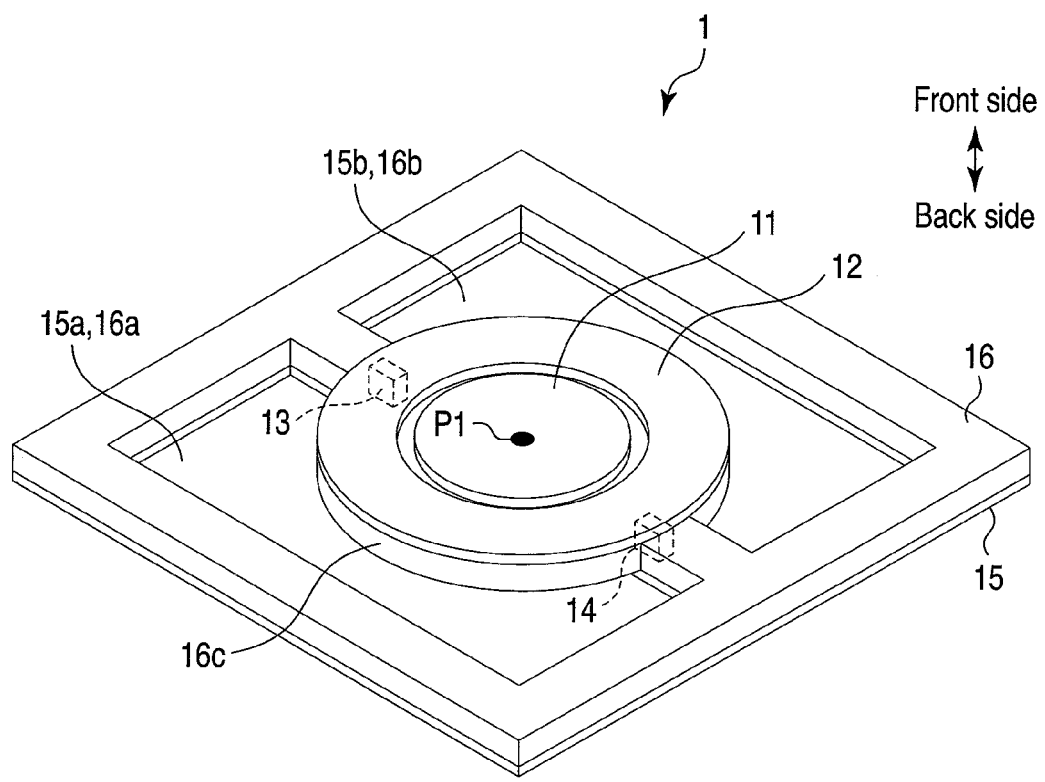
F I G. 1

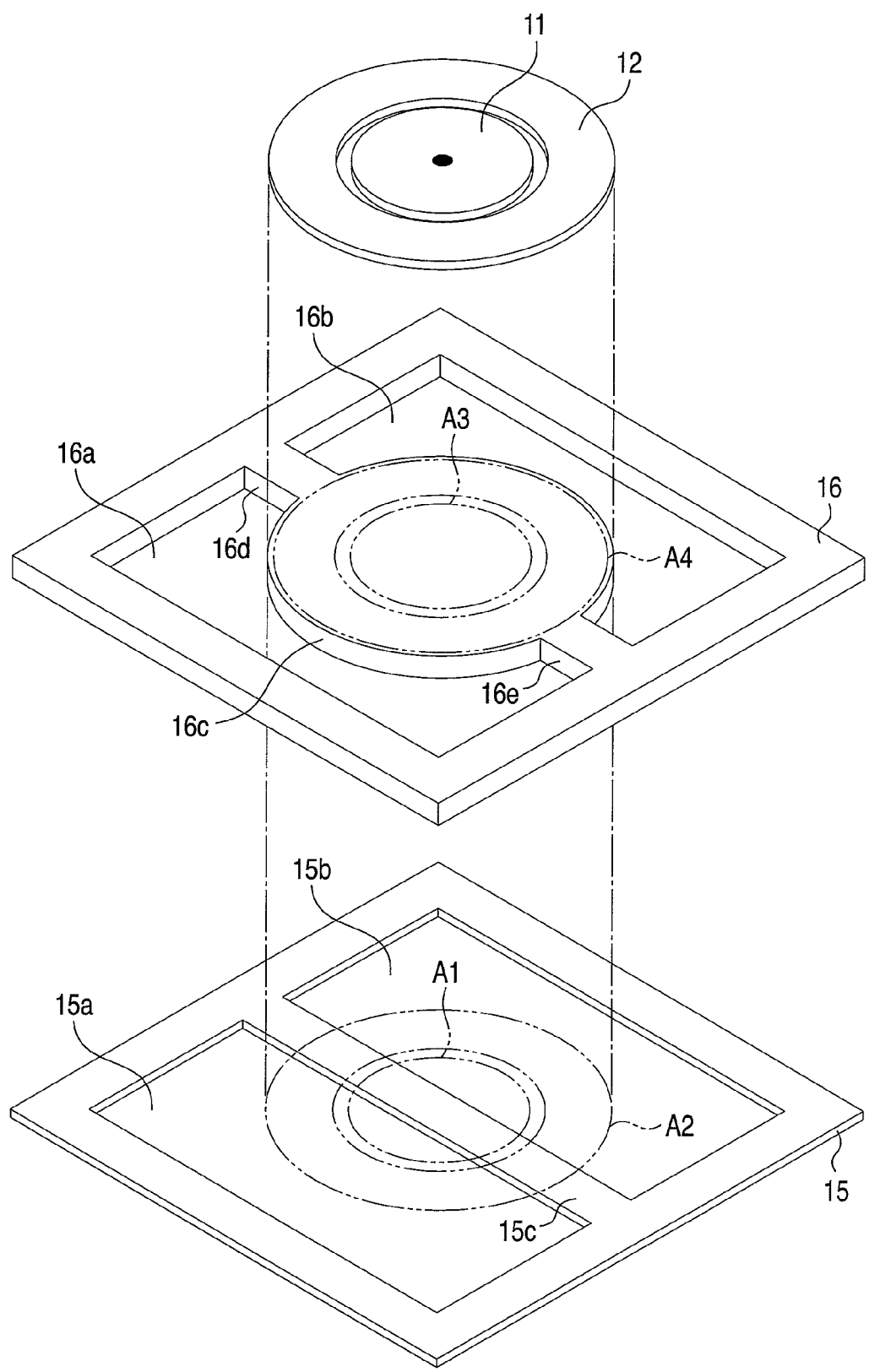
F I G. 2

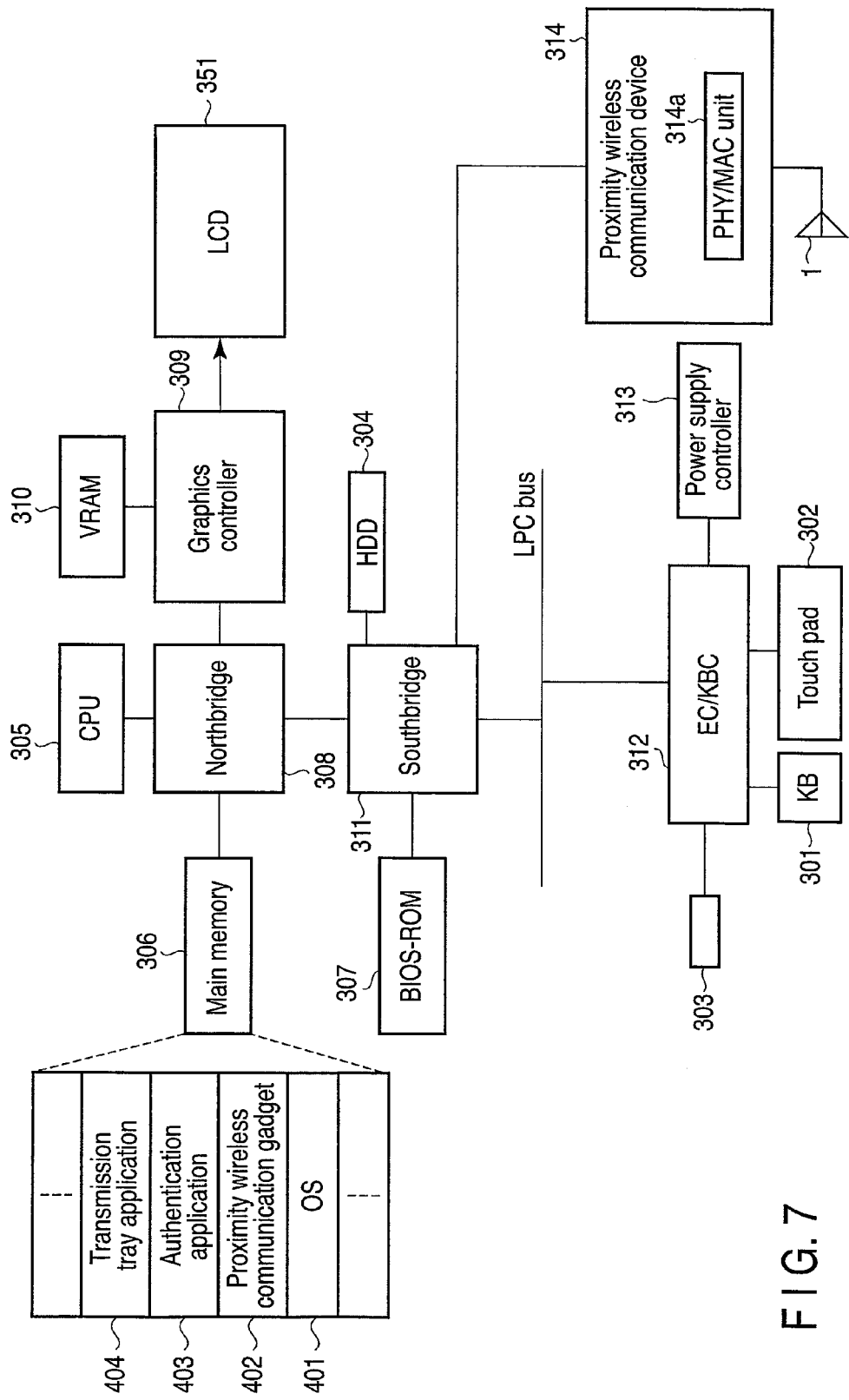
F I G. 7

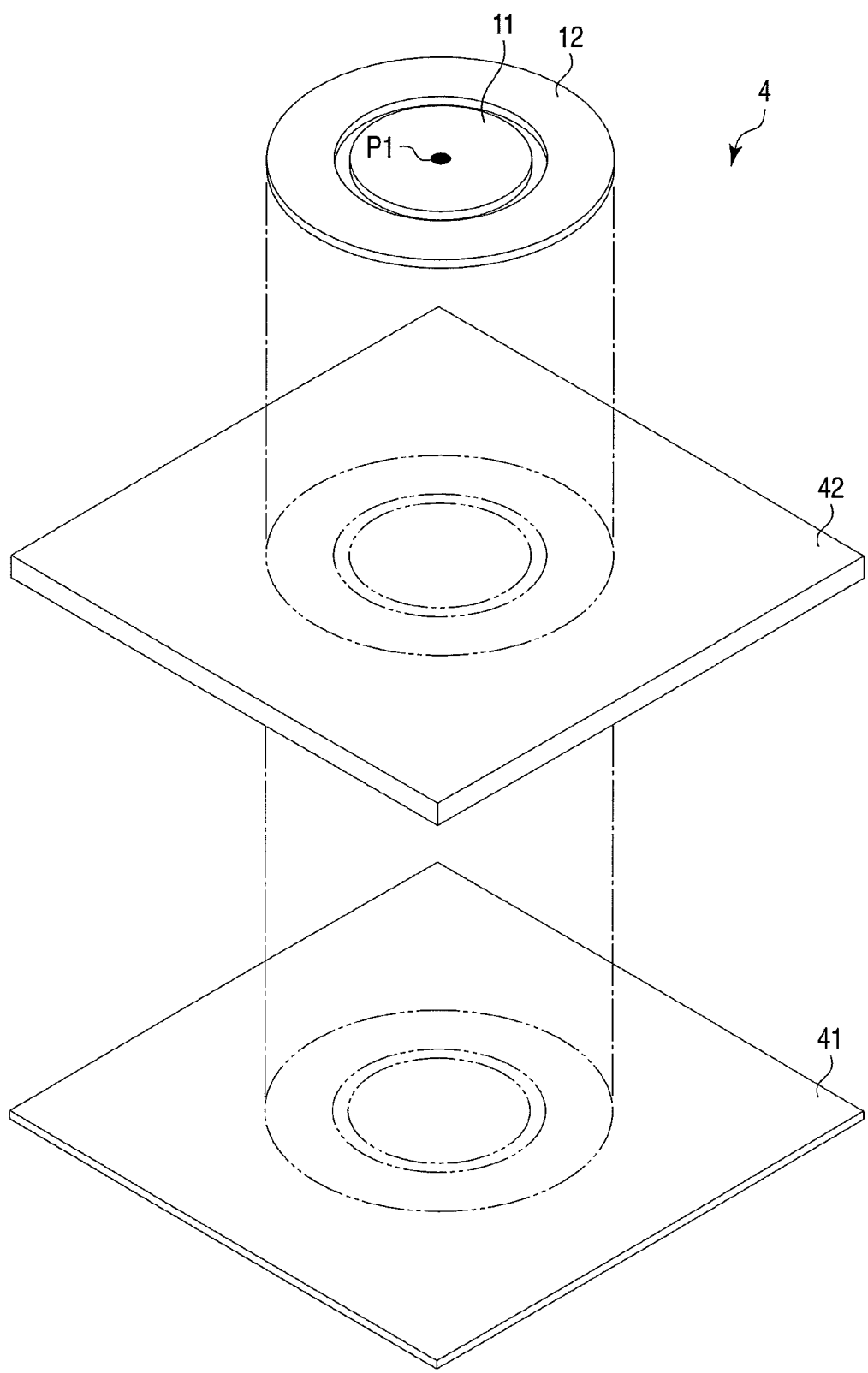
F I G. 10

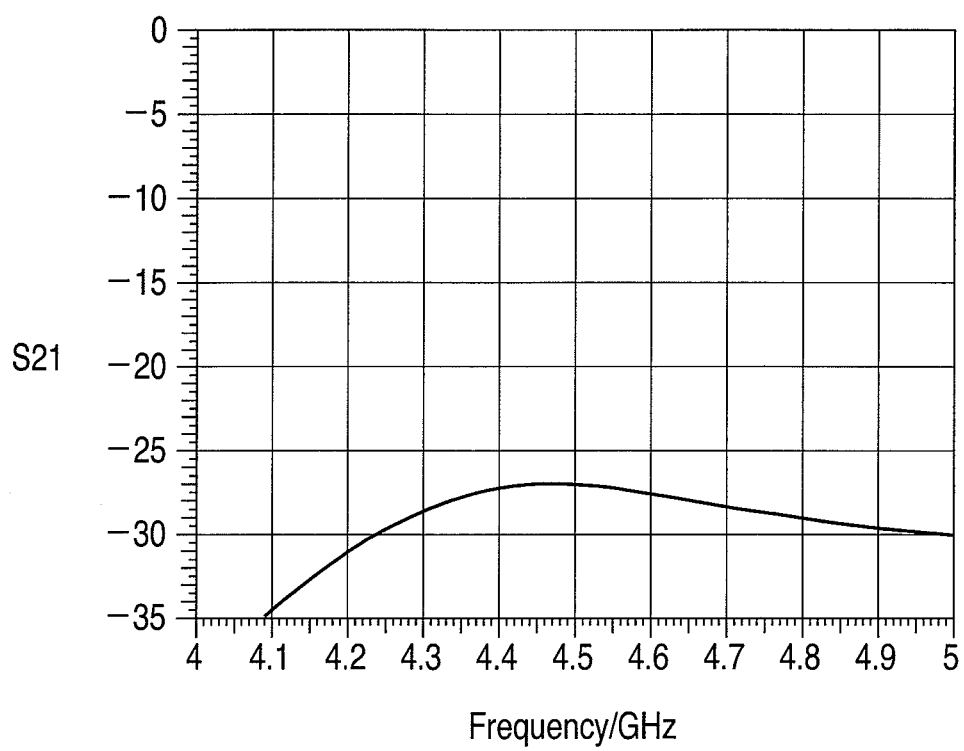
F I G. 11

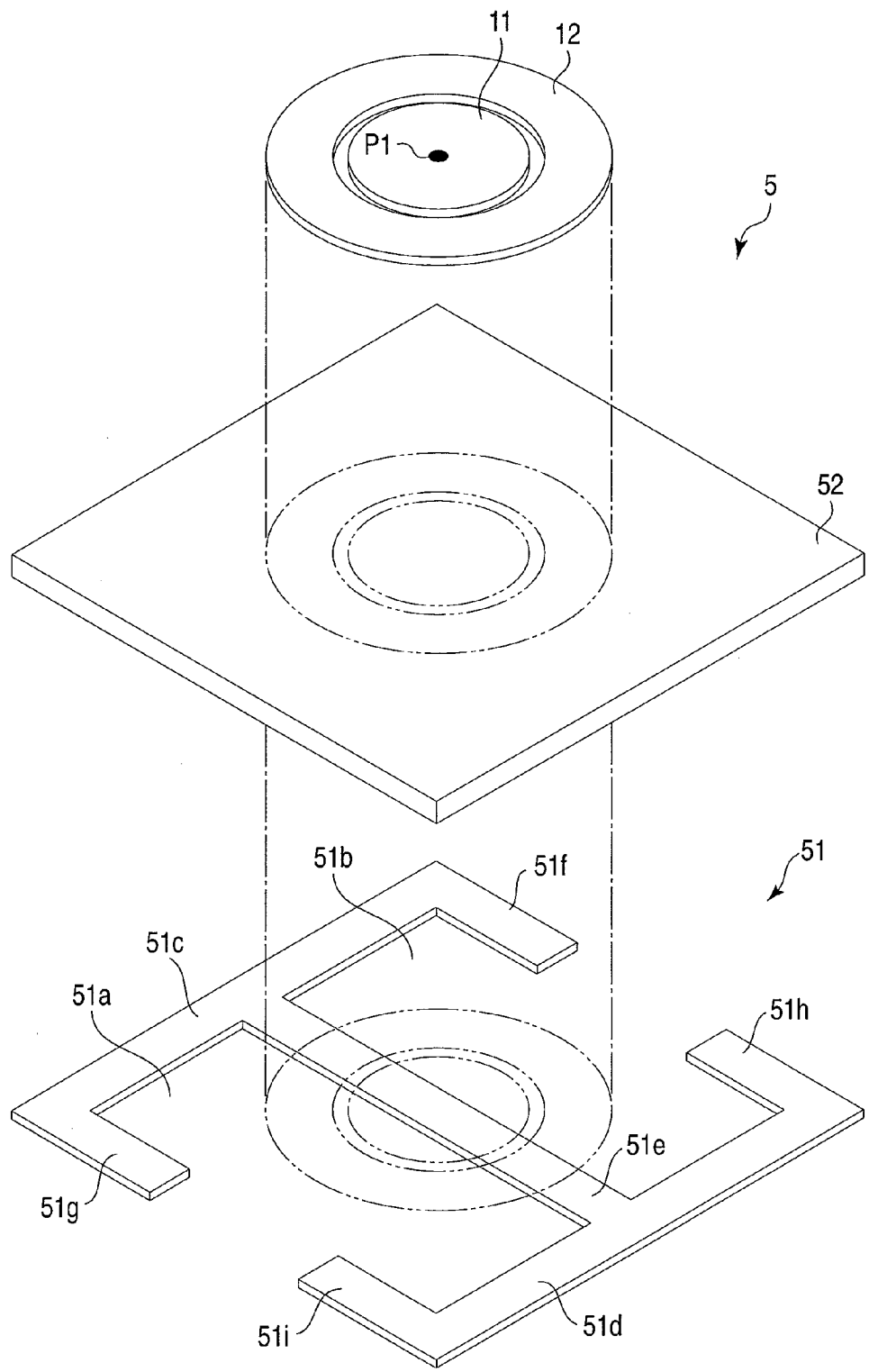
F I G. 12

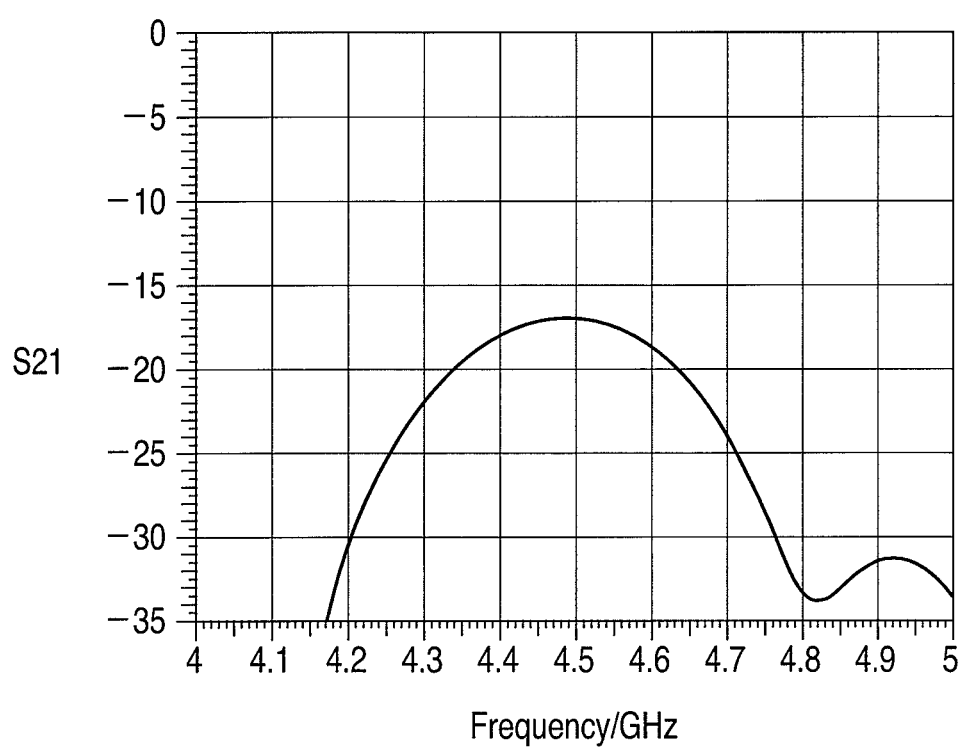
F I G. 13

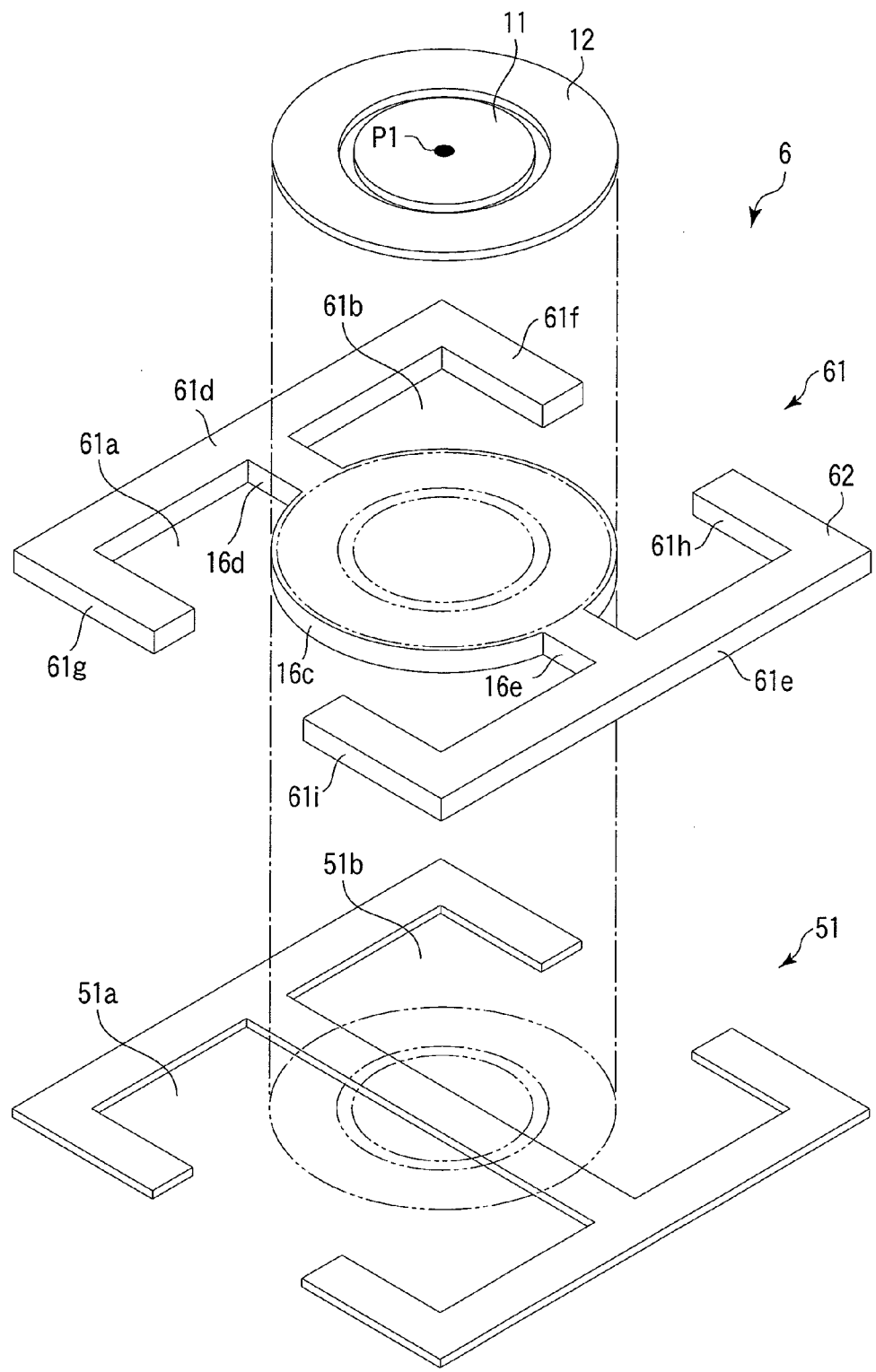
F I G. 14

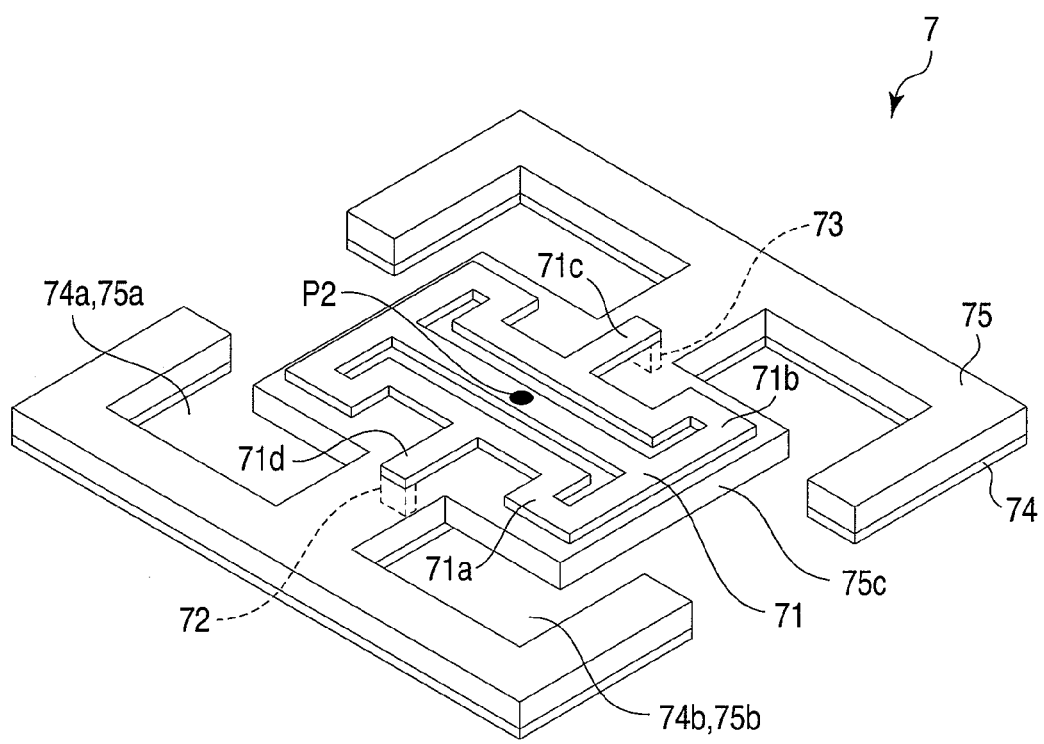
F I G. 17

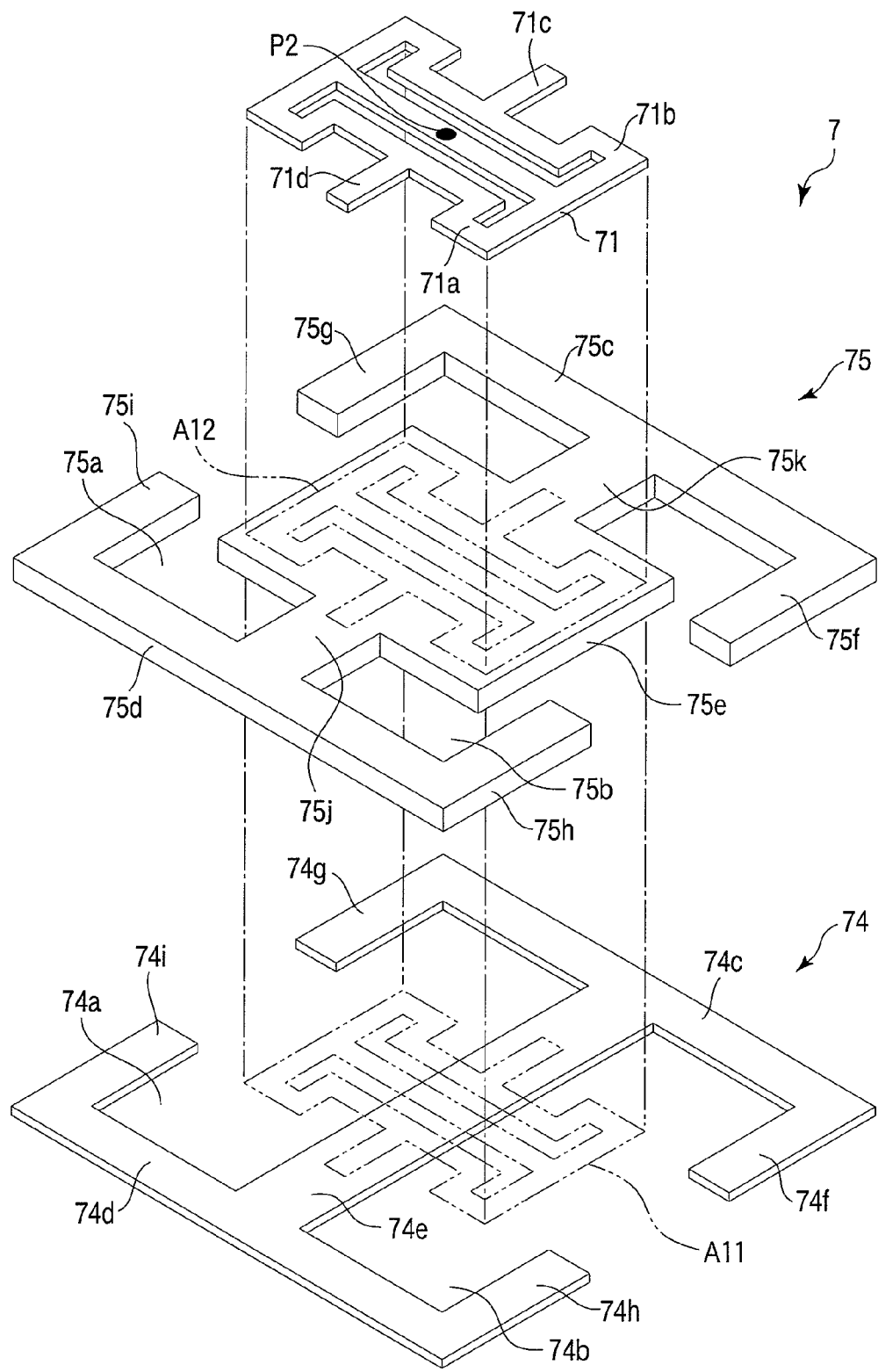
F I G. 18

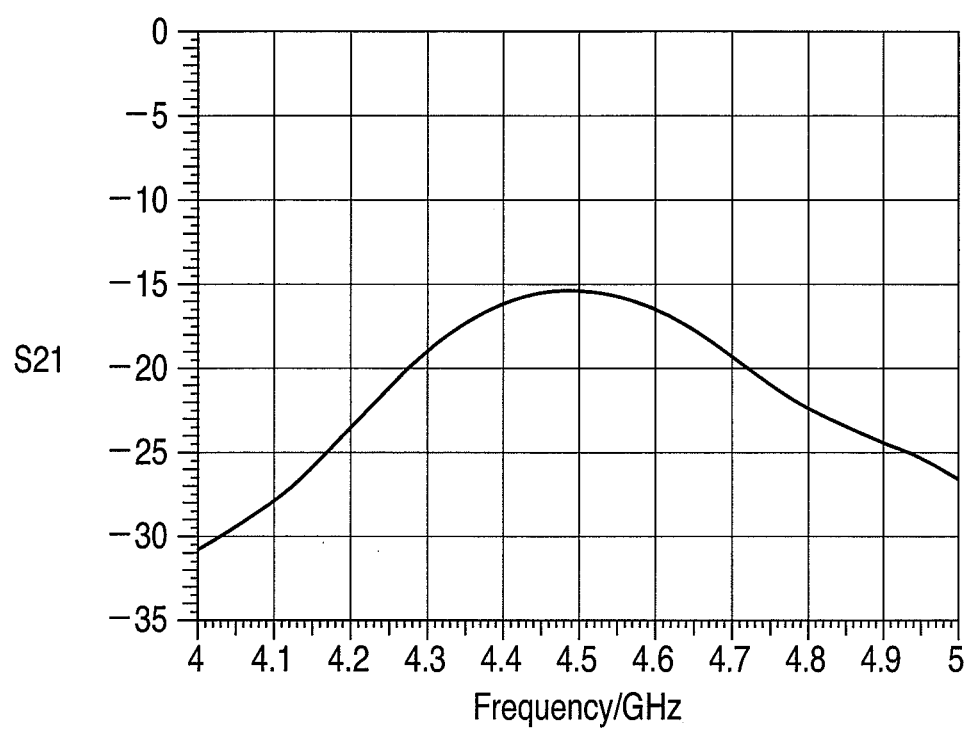
F I G. 22

COUPLER APPARATUS

CROSS-REFERENCE TO RELATED APPLICATIONS

This application is based upon and claims the benefit of priority from Japanese Patent Application No. 2010-157282, filed Jul. 9, 2010; the entire contents of which are incorporated herein by reference.

FIELD

Embodiments described herein relate generally to a coupler apparatus.

BACKGROUND

In general, a coupler apparatus is constituted by arranging a coupling element and a ground plane, each of which is obtained by forming a conductive material into a tabular shape, to face each other. Further, in the coupler apparatus on a transmission side, an electromagnetic field is generated around the coupler apparatus by feeding a signal to a portion between the coupling element and the ground plane to generate an electric current in the coupling element, thereby producing electromagnetic coupling between this coupler apparatus and a coupler apparatus on a reception side. In the coupler apparatus on the reception side, the above-described signal can be fetched as a potential difference between the coupling element and the ground plane when the electric current is generated in the coupling element based on the produced electromagnetic coupling.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is a perspective view of a coupler apparatus according to a first embodiment;

FIG. 2 is an exploded perspective view of the coupler apparatus depicted in FIG. 1;

FIG. 7 is a block diagram of the information processing apparatus depicted in FIG. 6;

FIG. 10 is an exploded perspective view of a coupler apparatus as a comparative example;

FIG. 11 is a view showing a relationship between a frequency and a transmission coefficient (S21);

FIG. 12 is an exploded perspective view of a coupler apparatus according to a second embodiment;

FIG. 13 is a view showing a relationship between a frequency and a transmission coefficient (S21);

FIG. 14 is an exploded perspective view of a coupler apparatus according to a third embodiment;

FIG. 17 is a perspective view of a coupler apparatus according to a fourth embodiment;

FIG. 18 is an exploded perspective view of a coupler apparatus depicted in FIG. 17;

FIG. 22 is a view showing a relationship between a frequency and a transmission coefficient (S21)

DETAILED DESCRIPTION

Various embodiments will be described hereinafter with reference to the accompanying drawings.

In general according to one embodiment, a coupler apparatus includes a monopole type coupling element, a parasitic element, and a ground plane. The coupling element includes a conductive material and subjects to power feeding to a feeding point. The parasitic element includes a conductive material. The parasitic element is arranged to be apart from the coupling element, and grounded. The ground plane includes a conductive material. The ground plane faces the coupling element and the parasitic element. The ground plane is cut out at a position where it faces at least a part of a portion other than the feeding point in the coupling element or near this position.

(First Embodiment)

Figure 3:
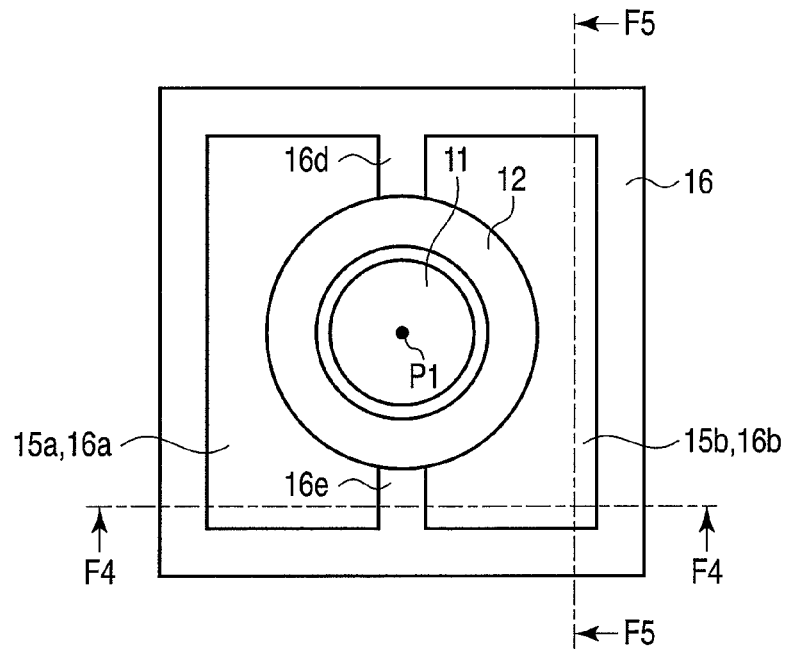
FIG. 3 is a plan view of the coupler apparatus depicted in FIG. 1.
Figure 4:
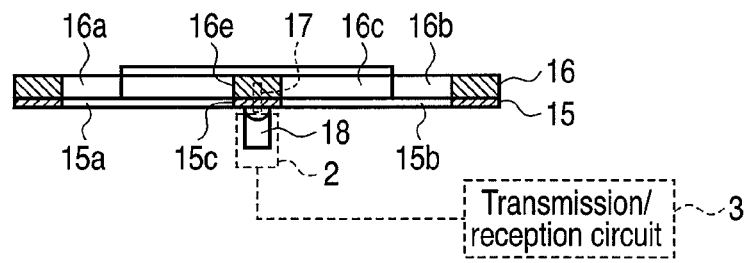
FIG. 4 is a cross-sectional view taken through F4-F4 as indicated by arrowheads in FIG. 3.
Figure 5:
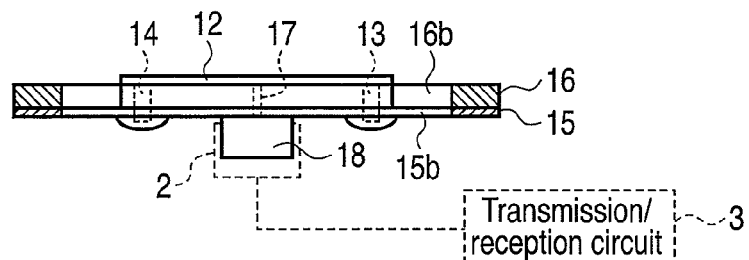
FIG. 5 is a cross-sectional view taken through F5-F5 as indicated by arrowheads in FIG. 3.

FIG. 1 is a perspective view of a coupler apparatus 1 according to a first embodiment. FIG. 2 is an exploded perspective view of the coupler apparatus 1. FIG. 3 is a plan view of the coupler apparatus 1. FIG. 4 is a cross-sectional view taken through F4-F4 as indicated by arrowheads in FIG. 3. FIG. 5 is a cross-sectional view taken through F5-F5 as indicated by arrowheads in FIG. 3.

As shown in FIG. 1 to FIG. 5, the coupler apparatus 1 includes a coupling element 11, a parasitic element 12, short elements 13 and 14, a ground plane 15, and a dielectric 16. Further, as shown in FIG. 4 and FIG. 5, the coupler apparatus 1 also includes a feeder line 17 and a connector 18. It is to be noted that the feeder line 17 and the connector 18 are omitted in FIG. 1 to FIG. 4. Furthermore, FIG. 2 shows outline structures and a positional relationship of the coupling element 11, the parasitic element 12, the ground plane 15, and the dielectric 16, but detailed illustration of the structures is omitted.

The coupling element 11, the ground plane 15, and the dielectric 16 all have tabular shapes, and the coupling element 11, the dielectric 16, and the ground plane 15 are aligned along their thickness directions in the mentioned order with these thickness directions being substantially uniformed. It is to be noted that an alignment direction (a thickness direction/ height direction) of the coupling element 11, the dielectric 16, and the ground plane 15 is determined as a front-and-back direction of the coupler apparatus 1 and the coupling element 11 side is determined as a front side in the following description. That is, the coupling element 11 is placed on the front side of the dielectric 16, and the ground plane 15 is placed on the back side of the dielectric 16.

The coupling element 11 is a thin circular disk made of a conductive material.

The parasitic element 12 is a thin ring made of a conductive material. An inside diameter of an opening of the parasitic element 12 is slightly larger than a diameter of the coupling element 11. The coupling element 11 is placed in the opening of the parasitic element 12 and not in contact with the parasitic element 12. The parasitic element 12 is placed on the front side of the dielectric 16. A thickness of the parasitic element 12 is substantially equal to a thickness of the coupling element 11. However, the thickness of the coupling element 11 may be different from the thickness of the parasitic element 12.

The short elements 13 and 14 are formed of a conductive material. The short elements 13 and 14 are joined and connected to a back surface of the parasitic element 12 at different positions. The short elements 13 and 14 may be integrated with or separated from the parasitic element 12. The short elements 13 and 14 pierce through the dielectric 16. The short elements 13 and 14 are electrically connected to the ground plane 15 by means of through holes or soldering.

The ground plane 15 is a thin layer that is formed on a substantially entire surface of the dielectric 16 and made of a conductive material. The ground plane 15 may be electrically connected to, e.g., a metal housing for a communication device in which the coupler apparatus 1 is mounted. In this case, the ground plane 15 also functions as a ground electrode. The ground plane 15 is apart from the coupling element 11 in such a manner that direct conduction is not achieved between the ground plane 15 and the coupling element 11. The ground plane 15 has openings 15a and 15b and a crosspiece 15c. The openings 15a and 15b have rectangular shapes parallel to each other and are pierced in the front-and-back direction. The crosspiece 15c is placed at a central part of the ground plane 15 to keep the openings 15a and 15b apart from each other.

The dielectric 16 is a plate made of a dielectric material. The dielectric 16 is placed in a gap between the coupling element 11 and the ground plane 15. The dielectric 16 has a thickness nearly equal to the gap between the coupling element 11 and the ground plane 15 and substantially fills the gap between the coupling element 11 and the ground plane 15. Therefore, a major part of each of the short elements 13 and 14 is placed in the dielectric 16. However, the thickness of the dielectric 16 may be smaller than the gap between the coupling element 11 and the ground plane 15. When the thickness of the dielectric 16 is smaller than the gap between the coupling element 11 and the ground plane 15, the dielectric 16 is typically in contact with the ground plane 15 and may be apart from the coupling plate 11. However, the dielectric 16 may be in contact with the coupling element 11 and may be apart from the ground plane 15. Alternatively, the dielectric 16 may be apart from both the coupling element 11 and the ground plane 15. Furthermore, a first dielectric that is in contact with the coupling element 11 and a second dielectric that is in contact with the ground plane 15 may be provided, respectively, and the first and second dielectrics may be arranged to be apart from each other. The dielectric 16 has openings 16a and 16b, a support portion 16c, and crosspieces 16d and 16e. The openings 16a and 16b are pierced in the front-and-back direction. The support portion 16c has a discoid shape and is placed at the center of the dielectric 16. The crosspieces 16d and 16e protrude from the support portion 16c to sides opposite to each other. The support portion 16c and the crosspieces 16d and 16e keep the openings 16a and 16b away from each other. The support portion 16c supports the coupling element 11 and the parasitic element 12 on the front side thereof. The crosspieces 16d and 16e are placed on a straight line running through the center of the support portion 16c. The crosspieces 16d and 16e are also parallel to the crosspiece 15c.

The feeder line 17 runs through the ground plane 15 and the dielectric 16. The feeder line 17 connects a point P1 near a central point of the coupling element 11 to the connector 18. The feeder line 17 is insulated from the ground plane 15.

The connector 18 faces the ground plane 15 and is fixed to, e.g., the dielectric 16. This connector 18 is coupled with the connector 2 in a state that the coupler apparatus 1 is mounted in a communication device. The connector 2 is connected to a transmission/reception circuit 3 mounted in the communication device through a cable. Moreover, the connector 18 and the connector 2 electrically connect the feeder line 17 to the cable. Therefore, the point P1 serves as a feeding point.

It is to be noted that, as described above, the first embodiment adopts the configuration that power is fed to the feeding point P1 through the connector 18 provided on the ground plane 15 side. However, a feeding method and an implementation method different from those in this first embodiment may be applied. For example, the coupler apparatus 1 may be implemented as a substrate that is integral with the transmission/reception circuit 3, and power may be fed to the feeding point P1 on the coupling element 11 side as a pattern of this substrate. Additionally, it is possible to adopt a configuration that a feeder line connected to the transmission/reception circuit 3 may be directly joined and connected to the coupling element.

Regions A1 and A2 indicated by an alternate long and two short dashes line in FIG. 2 are projection areas (areas facing the coupling element 11 an the parasitic element 12) when the coupling element 11 and the parasitic element 12 are projected onto the front surface of the ground plane 15 in the front-and-back direction. In FIG. 2, as can be understood from a state that a part of the area A1 overlaps the openings 15a and 15b, the openings 15a and 15b face a part of the coupling element 11. That is, the openings 15a and 15b are placed near an area facing the coupling element 11 (an adjacent area). As can be understood from a state that the crosspiece 15c is placed near a central part of the area A1, the openings 15a and 15b do not face a position near the feeding point P1.

Regions A3 and A4 indicated by an alternate long and two short dashes line in FIG. 2 are projection areas (areas facing the coupling element 11 an the parasitic element 12) when the coupling element 11 and the parasitic element 12 are projected onto the front surface side of the dielectric 16 in the front-and-back direction. In FIG. 2, as can be understood from a state that the openings 16a and 16b are placed around the areas A3 and A4, the openings 16a and 16b are placed at peripheries of the areas facing the coupling element 11 and the parasitic element 12.

Figure 6:
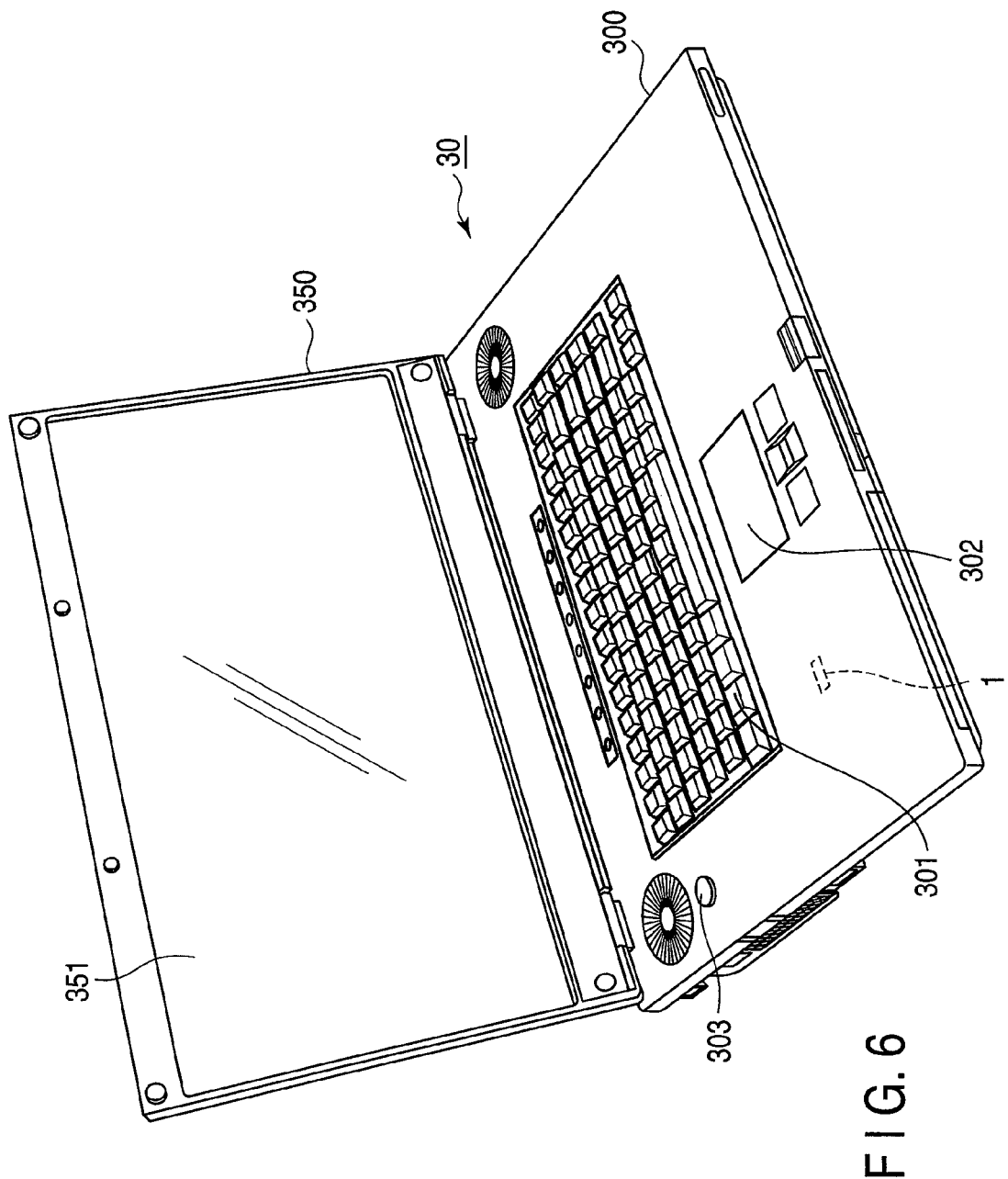
FIG. 6 is a perspective view showing an appearance of an information processing apparatus.

FIG. 6 is a perspective view showing an appearance of an information processing apparatus 30 as an example of a device on which the coupler apparatus 1 is mounted. This information processing apparatus 30 is realized as, e.g., a notebook type portable personal computer that can be driven by a battery.

The information processing apparatus 30 includes a main body 300 and a display unit 350. The display unit 350 is supported by the main body 300 to allow its swiveling motion. The display unit 350 can form an opened state where an upper surface of the main body 300 is exposed and a closed state where the upper surface of the main body 300 is covered. In the display unit 350, a liquid crystal display (LCD) 351 is provided.

The main body 300 has a thin box-like housing. A keyboard 301, a touch pad 302, and a power switch 303 are arranged in the main body 300. Part of the keyboard 301, part of the touch pad 302, and part of the power switch 303 are exposed to the outside of the housing from an upper surface of the housing. Furthermore, in the main body 300, the coupler apparatus 1 is provided in the housing. A direction of the coupler apparatus 1 in the main body 300 may be arbitrary. However, the front-and-back direction in FIG. 1 is typically set to coincide with a direction orthogonal to the upper surface of the housing of the main body 300. Moreover, the coupling element 11 rather than the ground plane 15 is typically placed near the upper surface of the housing of the main body 300.

The coupler apparatus 1 is utilized to perform proximity wireless communication between the information processing apparatus 30 and the other non-illustrated apparatus. The proximity wireless communication is executed in a peer-to-peer system. A communication enabled range is, e.g., approximately 3 cm. Wireless connection between communication terminals is achieved when a distance between the coupler apparatuses 1 mounted in the respective communication terminals becomes equal to or below the communication enabled range. When the distance between the two coupler apparatuses 1 becomes equal to or below the communication enabled range, the wireless communication between the two communication terminals is achieved. Furthermore, data such as a data file specified by a user or a predetermined synchronization target data file is transmitted or received between the two communication terminals.

In the example depicted in FIG. 6, the coupler apparatus 1 is arranged below a region that functions as a palm rest on the upper surface of the main body 300. Therefore, a part of the palm rest functions as a communication surface. When the other communication terminal that is to perform the proximity wireless communication with the information processing apparatus 30 is moved closer to the palm rest, the wireless connection between this communication terminal and the information processing apparatus 30 can be achieved.

FIG. 7 is a block diagram of the information processing apparatus 30. It is to be noted that like reference numerals denote parts equal to those in FIG. 6.

The information processing apparatus 30 includes the coupler apparatus 1, the keyboard 301, the touch pad 302, the power switch 303, and the LCD 351, and this apparatus also includes a hard disk drive (HDD) 304, a CPU 305, a main memory 306, a basic input/output system-ROM (BIOS-ROM) 307, a northbridge 308, a graphics controller 309, a video memory (VRAM) 310, a southbridge 311, an embedded controller/keyboard controller IC (EC/KBC) 312, a power supply controller 313, and a proximity wireless communication device 314.

The hard disk drive 304 stores codes required to execute an operating system (OS) or various kinds of programs such as an BIOS update program.

The CPU 305 executes various kinds of programs loaded to the main memory 306 from the hard disk drive 304 in order to control operations of the information processing apparatus 30. Programs executed by the CPU 305 include an operating system 401, a proximity wireless communication gadget application program 402, an authentication application program 403, or a transmission tray application program 404.

Additionally, the CPU 305 executes a BIOS program stored in the BIOS-ROM 307 to control hardware.

The northbridge 308 connects a local bus of the CPU 305 and the southbridge 311. The northbridge 308 has a built-in memory controller that controls access of the main memory 306. Further, the northbridge 308 has a function of executing communication with the graphics controller 309 via an AGP bus and the like.

The graphics controller 309 controls the LCD 351. The graphics controller 309 generates a video signal representing a display image that is displayed in the LCD 351 from display data stored in the video memory 310. It is to be noted that the display data is written into the video memory 310 under control of the CPU 305.

The southbridge 311 controls devices on an LPC bus. The southbridge 311 has a built-in ATA controller configured to control the hard disk drive 304. Furthermore, the southbridge 311 has a function of controlling access of the BIOS-ROM 307.

The embedded controller/keyboard controller IC (EC/KBC) 312 is a one-chip microcomputer in which an embedded controller and a keyboard controller are integrated. The embedded controller controls a power supply controller to turn on/off the information processing apparatus 30 in accordance with operations of the power switch 303 by a user. The keyboard controller controls the keyboard 301 and the touch pad 302.

The power supply controller 313 controls operations of a non-illustrated power supply apparatus. It is to be noted that the power supply apparatus generates operation power for each unit in the information processing apparatus 30.

The proximity wireless communication device 314 includes a PHY/MAC unit 314a. The PHY/MAC unit 314a operates under control of the CPU 305. The PHY/MAC unit 314a communicates with the other communication terminal through the coupler apparatus 1. This proximity wireless communication device 314 corresponds to the transmission/reception circuit 3 in FIG. 4. The proximity wireless communication device 314 is accommodated in a case of the main body 300.

It is to be noted that a peripheral component interconnect (PCI) bus is utilized for data transfer between the proximity wireless communication device 314 and the southbridge 311. It is to be noted that a PCI Express may be used in place of the PCI.

An operation of the thus configured coupler apparatus 1 will now be described.

The coupler apparatus 1 is used in a state where it faces another coupler apparatus 1 or a different type of coupler apparatus.

When a signal is transmitted to the coupler apparatus 1 from the transmission/reception circuit 3 connected as shown in FIG. 4 and FIG. 5, this signal is supplied to the feeding point P1 of the coupling element 11 through the cable, the connector 2, the connector 18, and the feeder line 17. Then, a current associated with the signal is generated in a current path extending from the feeding point P1 to a peripheral edge portion of the coupling element 11. That is, the coupling element 11 behaves like a monopole type antenna element.

On the other hand, the parasitic element 12 is apart from the coupling element 11, the signal is not fed to the parasitic element 12, and electric conduction is achieved between the parasitic element 12 and the ground plane 15 through the short elements 13 and 14. Further, since the ground plane 15 is earthed, the current is generated in the coupling element 11 as descried above, and hence a potential difference is produced between the coupling element 11 and the parasitic element 12 and the ground plane 15, whereby the signal is induced to the opposed coupler apparatus. That is, the signal is wirelessly transmitted from the coupler apparatus 1 to the other coupler apparatus.

In addition, since the coupling element 11 is of the monopole type as described above, it is preferable for an electrical length from the feeding point P1 to a peripheral edge of the coupling element to substantially correspond to an integral multiple of ¼ of a wavelength λ of a central frequency of the signal.

Meanwhile, in the above-described use condition, since the ground late 15 is earthed and the coupling element 11 is close to the ground plane 15, energy of the current produced in the coupling element 11 partially leaks to the ground plane 15. However, since the openings 15a and 15b are formed in the coupling apparatus 1, the ground plane 15 is not aligned in the front-and-back direction with respect to a part of the coupling element 11. Therefore, a distance between the current path in the coupling element 11 and the ground plane 15 is larger than that in an example where the openings 15a and 15b are not formed, whereby an amount of the energy that leaks from the coupling element 11 to the ground plane 15 is reduced.

Further, when the dielectric 16 is arranged between the ground plane 15 and the coupling element 11, an electric field between the ground plane 15 and the coupling element 11 is concentrated onto a part where the dielectric 16 is sandwiched, and the energy emitted from the dielectric 16 is drawn to the ground plane 15 side. Thus, providing the openings 16a and 16b in the dielectric 16 enables avoiding the concentration of the electric field between the ground plane 15 and the coupling element 11. Furthermore, as a result, an amount of energy utilized for electromagnetic coupling with the coupler apparatus as a communication party increase, thereby improving a transmission coefficient (S21).

In particular, in regard to the circumference of the coupling element 11, increasing areas of the openings 15a, 15b, 16a, and 16b enables improving the transmission coefficient (S21) with the coupler apparatus as the communication party.

Meanwhile, it is generally known that, when an area of the entire ground plane is large, performance of the coupler apparatus can be improved, and the amount of energy utilized for the electromagnetic coupling with the coupler apparatus as the communication party can be thereby increased. Although the openings 15a and 15b are formed in the ground plane 15, a size of the entire ground plane 15 is the same as that of the ground plane having no openings 15a and 15b formed therein. Therefore, the performance substantially equal to those of the ground plane having no openings 15a and 15b formed therein can be maintained, and the amount of energy utilized for the electromagnetic coupling is not be reduced. Furthermore, when a metal housing, an electrical substrate, or a member having a metallic coat is arranged on a lower portion of the ground plane 15 (an opposite side of the coupling element 11) at a position facing the coupling element 11, the performance can be further improved.

Such a point that the characteristics are improved when the areas of the openings near the coupling element 11 are large and a point that the characteristics are improved when the area of the ground plane is large are the same in a later-described second embodiment and other embodiments.

Figure 8:
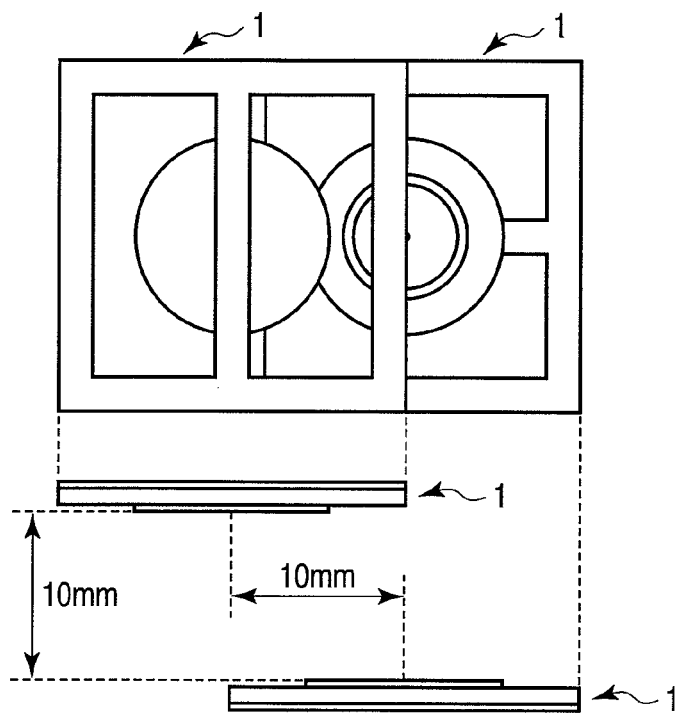
FIG. 8 is a view showing an example of an opposed state of two coupler apparatuses.
Figure 9:
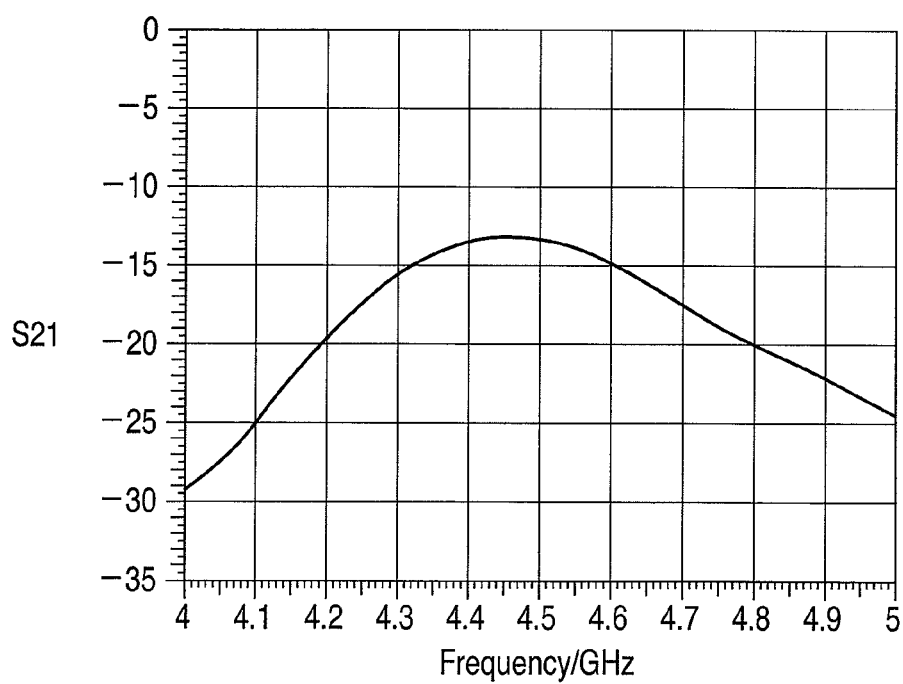
FIG. 9 is a view showing a relationship between a frequency and a transmission coefficient (S21)

FIG. 9 is a view showing a relationship between a frequency and a transmission coefficient (S21) under conditions that the two coupler apparatuses 1 face each other in a state depicted in FIG. 8.

FIG. 10 is an exploded perspective view of a coupler apparatus 4 as a comparative example. It is to be noted that, in FIG. 10, like reference numerals denote parts equal to those in FIG. 1 to FIG. 5.

This coupler apparatus 4 includes a coupling element 11, a parasitic element 12, a ground plane 41, and a dielectric 42. Moreover, although not shown in FIG. 10, the coupler apparatus 4 includes short elements 13 and 14. That is, the coupler apparatus 4 includes the ground plane 41 and the dielectric 42 in place of the ground plane 15 and the dielectric 16 in the coupler apparatus 1.

The ground plane 41 and the dielectric 42 are different from the ground plane 15 and the dielectric 16 in that the ground plane 41 and the dielectric 42 have simple tabular shapes without having openings 15a, 15b, 16a, and 16b formed therein.

FIG. 11 is a view showing a relationship between a frequency and a transmission coefficient (S21) under conditions that the two coupler apparatuses 4 face each other in the same state as that in FIG. 8.

As obvious from a comparison between FIG. 9 and FIG. 11, the transmission coefficient can be improved in the wide frequency range due to presence of the openings 15a, 15b, 16a, and 16b in the coupler apparatus 1.

(Second Embodiment)

FIG. 12 is an exploded perspective view of a coupler apparatus 5 according to a second embodiment. It is to be noted that like reference numerals denote parts equal to those in FIG. 1 to FIG. 5, thereby omitting a detailed description thereof.

As shown in FIG. 12, the coupler apparatus 5 includes a coupler element 11, a parasitic element 12, a ground plane 51, and a dielectric 52. Additionally, the coupler apparatus 5 further includes short elements 13 and 14, a feeder line 17, and a connector 18 such as shown in FIG. 1 to FIG. 5, but these members are omitted in FIG. 12. Further, FIG. 12 shows outline structures and a positional relationship of the coupling element 11, the parasitic element 12, the ground plane 51, and the dielectric 52, but detailed illustration of the structures is omitted.

That is, the coupler apparatus 5 includes the ground plane 51 and the dielectric 52 in place of the ground plane 15 and the dielectric 16 in the coupler apparatus 1.

The ground plane 51 is a thin layer made of a conductive material like the ground plane 15 and has notches 51a and 51b. The notches 51a and 51b have shapes different from those of the openings 15a and 15b. Each of the notches 51a and 51b extends to an end portion of the ground plane 51 in a direction parallel to an alignment direction of the notches 51a and 51b, and it is opened toward the outside of the ground plane 51. As a result, the ground plane 51 has the following shape on a plane orthogonal to a thickness direction thereof. That is, the ground plane 51 has seven conductive portions 51c, 51d, 51e, 51f, 51g, 51h, and 51i all having rectangular shapes. The conductive portions 51c and 51d are parallel to each other. Both ends of the conductive portion 51e are in contact with respective intermediate portions of the conductive portions 51c and 51d. The conductive portions 51f and 51g projected toward the conductive portion 51d from both ends of the conductive portion 51c. The conductive portions 51h and 51i projected toward the conductive portion 51c from both ends of the conductive portion 51d. Projecting distances of the conductive portions 51f and 51g from the conductive portion 51c and projecting distances of the conductive portions 51h and 51i from the conductive portion 51d are determined in such a manner that the conductive portion 51f and the conductive portion 51g do not come into contact with the conductive portion 51h and the conductive portion 51i, respectively.

The dielectric 52 is obtained by forming a dielectric material into a tabular shape like the dielectric 16, but it is different from the dielectric 16 in that the openings 16a and 16b are not formed. The dielectric 52 is arranged like the dielectric 16.

Since the notches 51a and 51b are formed even in such a coupler apparatus 5, a distance between a current path in the coupling element 11 and the ground plane 51 is large, and hence an amount of energy leaking from the coupling element 11 to the ground plane 51 is reduced. Moreover, as a result, an amount of energy utilized for the electromagnetic coupling increases, so that the performance of the coupling is improved.

FIG. 13 is a view showing a relationship between a frequency and a transmission coefficient (S21) under conditions that the two coupler apparatuses 5 face each other in the same state as that depicted in FIG. 8.

As obvious from a comparison between FIG. 11 and FIG. 13, the transmission coefficient of the coupler apparatus 1 can be improved in the wide frequency range due to presence of the openings 15a, 15b, 16a, and 16b.

(Third Embodiment)

FIG. 14 is an exploded perspective view of a coupler apparatus 6 according to a third embodiment. It is to be noted that like reference numerals denote parts equal to those in FIG. 1 to FIG. 5 and FIG. 12, thereby omitting a detailed description thereof.

As shown in FIG. 14, the coupler apparatus 6 includes a coupling element 11, a parasitic element 12, a ground plane 51, and a dielectric 61. Additionally, the coupler apparatus 6 further includes short elements 13 and 14, a feeder line 17, and a connector 18 such as shown in FIG. 1 to FIG. 5, but these members are omitted in FIG. 14. Further, FIG. 14 shows outline structures and a positional relationship of the coupling element 11, the parasitic element 12, the ground plane 51, and the dielectric 61, but detailed illustration of the structures is omitted.

That is, the coupler apparatus 6 includes the ground plane 51 and the dielectric 61 in place of the ground plane 15 and the dielectric 16 in the coupler apparatus 1.

The dielectric 61 is a plate made of a dielectric material like the dielectric 16, and it has notches 61a and 61b. Shapes of the notches 61a and 61b are different from those of the openings 16a and 16b. Each of the notches 61a and 61b is opened to the outside of the dielectric 61 in a direction parallel to an alignment direction of the notches 61a and 61b. As a result, the dielectric 61 has the following shape on a plane orthogonal to a thickness direction thereof. That is, the dielectric 61 has six rectangular portions 61d, 61e, 61f, 61g, 61h, and 61i all having rectangular shapes besides a support portion 16c and crosspieces 16d and 16e. The rectangular portions 61d and 61e are substantially parallel to each other. An end portion of the crosspiece 16d is in contact with an intermediate portion of the rectangular portion 61d at a substantially right angle. An end portion of the crosspiece 16e is in contact with an intermediate portion of the rectangular portion 61e at a substantially right angle. The rectangular portions 61f and 61g projected toward the rectangular portion 61e from both ends of the rectangular portion 61d. The rectangular portions 61h and 61i projected toward the rectangular portion 61d from both ends of the rectangular portion 61e. Projecting distances of the rectangular portions 61f and 61g from the rectangular portion 61d and projecting distances of the rectangular portions 61h and 61i from the rectangular portion 61e are determined in such a manner that the rectangular portion 61f and the rectangular portion 61g do not come into contact with the rectangular portion 61h and the rectangular portion 61i, respectively.

Since the notches 51a, 51b, 61a, and 61b are formed even in such a coupler apparatus 6, a distance between a current path in the coupling element 11 and the ground plane 51 is large, an amount of energy leaking from the coupling element 11 to the ground plane 51 is reduced. Further, as a result, an amount of energy used for the electromagnetic coupling increases, so that the performance of the coupling is improved.

Figure 15:
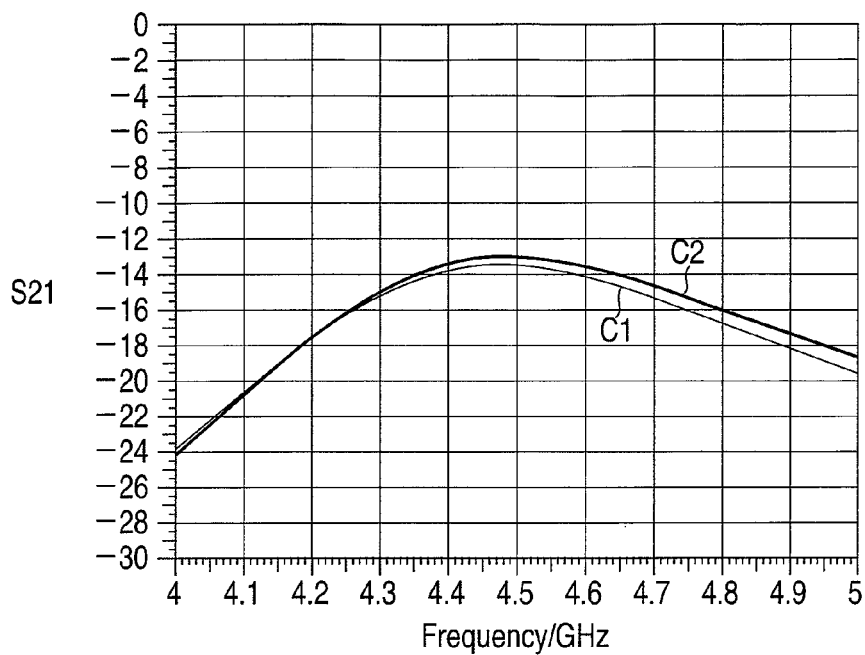
FIG. 15 is a view showing a performance regarding to a rotation of a coupler apparatus.

FIG. 15 is a view showing a performance regarding to a rotation of the coupler apparatus 6.

A curved line C1 in FIG. 15 indicates a relationship between a frequency and a transmission coefficient (S21) under conditions that the two coupler apparatuses 6 face each other in the same state as that depicted in FIG. 8, i.e., in a state that the crosspieces 16d and 16e are orthogonal to each other in the two coupler apparatuses 6. Further, a curved line C2 in FIG. 15 indicates a relationship between a frequency and a transmission coefficient (S21) under conditions that the two coupler apparatuses 6 have a positional relationship as shown in FIG. 8 but they face each other in a state that the crosspieces 16d and 16e are parallel to each other in the two coupler apparatuses 6.

Figure 16:
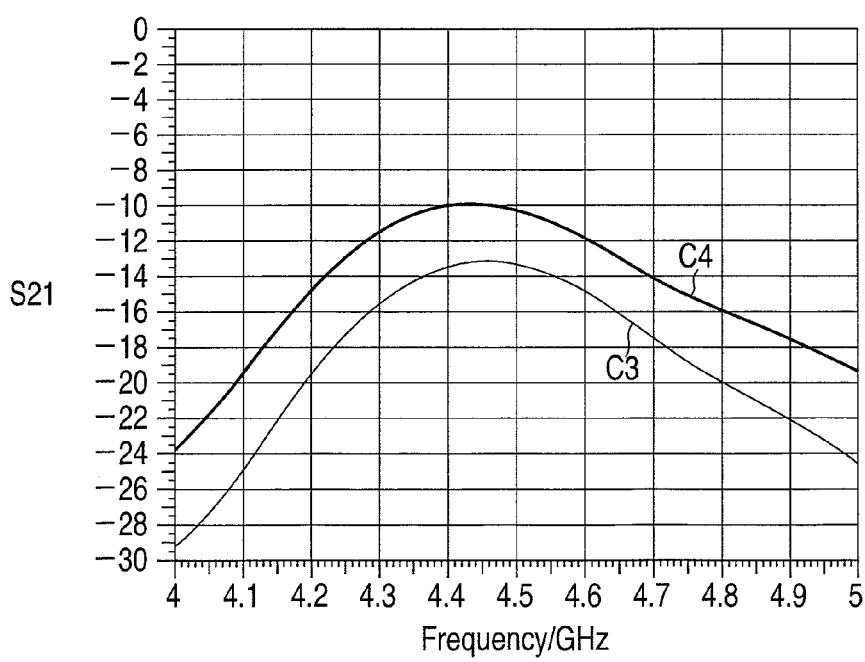
FIG. 16 is a view showing a performance regarding to a rotation of a coupler apparatus.

FIG. 16 is a view showing a performance regarding to a rotation of the coupler apparatus 1.

A curved line C3 in FIG. 16 indicates a relationship between a frequency and a transmission coefficient (S21) under conditions that the two coupler apparatuses 1 face each other in the state depicted in FIG. 8, i.e., a state that the crosspieces 16d and 16e are orthogonal to each other in the two coupler apparatuses 1. Furthermore, a curved line C4 in FIG. 16 indicates a relationship between a frequency and a transmission coefficient (S21) under conditions that the two coupler apparatuses 6 have a positional relationship as shown in FIG. 8 but they face each other in a state that the crosspieces 16d and 16e are parallel to each other in the two coupler apparatuses 1.

As obvious from a comparison between FIG. 15 and FIG. 16, a change in transmission coefficient in the coupler apparatus 6 when a relative direction of the two opposed coupler apparatuses is changed is smaller than that in the coupler apparatus 1. Therefore, it can be understood that the performance of the coupler apparatus 6 is improved as compared with the coupler apparatus 1. However, the maximum transmission coefficient of the coupler apparatus 1 is higher than that of the coupler apparatus 6, and the performance of the coupling of the coupler apparatus 1 is superior to that of the coupler apparatus 6.

(Fourth Embodiment)

FIG. 17 is a perspective view of a coupler apparatus 7 according to a fourth embodiment. FIG. 18 is an exploded perspective view of the coupler apparatus 7 depicted in FIG. 17.

As shown in FIG. 17 and FIG. 18, the coupler apparatus 7 includes a coupling element 71, short elements 72 and 73, a ground plane 74, and a dielectric 75. Further, the coupler apparatus 7 further includes a feeder line 17 and a connector 18 such as shown in FIG. 1 to FIG. 5, but these members are omitted in FIG. 17 and FIG. 18. Furthermore, FIG. 18 shows outline structures and a positional relationship of the coupling element 71, the ground plane 74, and the dielectric 74, but detailed illustration of the structures is omitted.

The coupling element 71, the ground plane 74, and the dielectric 75 all have tabular shapes, and the coupling element 71, the dielectric 75, and the ground plane 74 are aligned along their thickness directions (the front-and-back direction) in the mentioned order with these thickness directions being uniformed. That is, the coupling element 71 is placed on the front side of the dielectric 75, and the ground plane 74 is placed on the back side of the dielectric 75.

The coupling element 71 has the following shape on a plane orthogonal to the thickness direction thereof. That is, the coupling element 71 has loop portions 71a and 71b and projecting portions 71c and 71d. The loop portions 71a and 71b are partially shared by each other. The projecting portions 71c and 71d projected from respective intermediate portions of the loop portions 71a and 71b in directions opposite to each other.

One end of the non-illustrated feeder line 17 is connected to a point P2 provided at an intermediate portion of the shared part of the loop portions 71a and 71b, and this point P2 serves as a feeding point.

The short elements 72 and 73 are formed of a conductive material. The short elements 72 and 73 are joined and connected to back surfaces of the projecting portions 71c and 71d near end portions of the projecting portions 71c and 71d, respectively. The short elements 72 and 73 may be integrated with or may be separated from the coupling element 71. The short elements 72 and 73 pierce through the dielectric 75. The short elements 72 and 73 are electrically connected to the ground plane 74 by means of a through hole or soldering.

The ground plane 74 is a thin layer that is formed on a substantially entire surface of the dielectric 75 and made of a conductive material. This ground plane 74 is electrically connected to, e.g., a metal housing of a communication device in which the coupler apparatus 7 is mounted. Therefore, the ground plane 74 also functions as a ground electrode. The ground plane 74 is apart from the coupling element 71 in such a manner that direct conduction is not achieved between the ground plane 74 and the coupling element 71. The ground plane 74 has notches 74a and 74b. The notches 74a and 74b have rectangular shapes parallel to each other, and holes pierced in the front-and-back direction are formed to reach end portions of the ground plane 74 in a direction parallel to an alignment direction of the notches 74a and 74b and to be opened to the outside of the ground plane 74. As a result, the ground plane 74 has the following shape on a plane orthogonal to a thickness direction thereof. That is, the ground plane 74 has seven conductive portions 74c, 74d, 74e, 74f, 74g, 74h, and 74i all having rectangular shapes. The conductive portions 74c and 74d are substantially parallel to each other. The conductive portion 74e is in contact with an intermediate portion of the conductive portion 74c at a substantially right angle. The conductive portion 74e is in contact with an intermediate portion of the conductive portion 74d at a substantially right angle. The conductive portions 74f and 74g projected toward the conductive portion 74d from both ends of the conductive portions 74c. The conductive portions 74h and 74i projected toward the conductive portion 74c from both ends of the conductive portion 74d. Projecting distances of the conductive portions 74f and 74g from the conductive portion 74c and projecting distances of the conductive portions 74h and 74i from the conductive portion 74d are determined in such a manner that the conductive portion 74f and the conductive portion 74g do not come into contact with the conductive portion 74h and the conductive portion 74i, respectively.

The dielectric 75 is a plate made of a dielectric material. The dielectric 75 is placed in a gap between the coupling element 71 and the ground plane 74. The dielectric 75 has a thickness nearly equal to the gap between the coupling element 71 and the ground plane 74 and substantially fills the gap between the coupling element 71 and the ground plane 74. Therefore, a major part of each of the short elements 72 and 73 is placed in the dielectric 75. However, the thickness of the dielectric 75 may be smaller than the gap between the coupling element 71 and the ground plane 74. When the thickness of the dielectric 75 is smaller than the gap between the coupling element 71 and the ground plane 74, the dielectric 75 is typically in contact with the ground plane 74 and may be apart from the ground plane 71. However, the dielectric 75 may be in contact with the coupling element 71 and apart from the ground plane 74. Alternatively, the dielectric 75 may be apart from both the coupling element 71 and the ground plane 74. Furthermore, a first dielectric that is in contact with the coupling element 71 and a second dielectric that is in contact with the ground plane 74 may be provided, respectively, and the first and second dielectrics may be arranged to be apart from each other. The dielectric 16 has notches 75a and 75b. The notches 75a and 75b have shapes that holes pierced in the front-and-back direction are opened to the outside of the dielectric 75 in a direction parallel to an alignment direction of the notches 75a and 75b. As a result, the dielectric 75 has the following shape on a plane orthogonal to the thickness direction thereof. That is, the dielectric 75 has a support portion 75e and eight rectangular portions 75c, 75d, 75f, 75g, 75h, 75i, 75j, and 75k all having rectangular shapes. The support portion 75e supports the coupling element 71. The rectangular portions 75j and 75k projected from the support portion 75e in directions opposite to each other. The rectangular portions 75c and 75d are substantially parallel to each other. An end portion of the rectangular portion 75k is in contact with an intermediate portion of the rectangular portion 75c at a substantially right angle. An end portion of the rectangular portion 75j is in contact with an intermediate portion of the rectangular portion 75d at a substantially right angle. The rectangular portions 75f and 75g projected from both ends of the rectangular portion 75c toward the rectangular portion 75d. The rectangular portions 75h and 75i projected toward the rectangular portion 75c from both ends of the rectangular portion 75d. Protruding distances of the rectangular portions 75f and 75g from the rectangular portion 75c and protruding distances from the rectangular portions 75h and 75i from the rectangular portion 75d are determined in such a manner that the rectangular portion 75f and the rectangular portion 75h do not come into contact with the rectangular portion 75g and the rectangular portion 75i, respectively.

An area A11 indicated by an alternate long and two short dashes line is a projection area (an area facing the coupling element 71) when the coupling element 71 is projected with respect to the front surface of the ground plane 74 in the front-and-back direction. In FIG. 18, as can be understood from a configuration that the area A11 partially overlaps the notches 74a and 74b, the notches 74a and 74b are placed to face a part of the coupling element 71. That is, the notches 74a and 74b are placed near the area facing the coupling element 71 (an adjacent area). The support portion 75e is placed near a central part in the area A11, and the notches 74a and 74b do not face positions near the feeding point P2.

An area A12 indicated by an alternate long and two short dashes line in FIG. 18 is a projection area (an area facing the coupling element 71) when the coupling element 71 is projected with respect to the front surface side of the dielectric 75 in the front-and-back direction. In FIG. 18, as can be understood from a configuration that the notches 75a and 75b are placed around the area A12, the notches 75a and 75b are placed around the area facing the coupling element 71.

The coupler apparatus 7 having the above-described configuration is mounted in a device such as an information processing apparatus 30 like the coupler apparatus 1.

An operation of the thus configured coupler apparatus 7 will now be described.

The coupler apparatus 7 is used in a state where it faces another coupler apparatus 7 or a different type of coupler apparatus.

When a signal is supplied to the feeding point P2 of the coupling element 71, a current associated with the signal is generated in the coupling element 71 from the feeding point P2 toward the ends of the projecting portions 71c and 71d. That is, the coupling element 71 behaves like a folded-dipole type antenna element, and the signal is induced to the opposed coupler apparatus. That is, the signal is wirelessly transmitted from the coupler apparatus 7 to the other coupler apparatus.

In addition, since the coupling element 71 is of the folded-dipole type as described above, it is preferable for an electrical length from the feeding point P2 to each of the short elements 72 and 73 to substantially correspond to an integral multiple of ½ of a wavelength λ of a central frequency of the signal.

Meanwhile, since the ground plane 74 is grounded and the coupling element 71 is close to the ground plane 74, energy of the current generated in the coupling element 71 partially directly leaks to the ground plane 74 without flowing through the short elements 72 and 73. However, since the notches 74a and 74b are formed in the coupler apparatus 7, the ground plane 74 is not aligned in the front-and-back direction with respect to a part of the coupling element 71. Therefore, as compared with an example where the notches 74a and 74b are not formed, a distance between a current path in the coupling element 7 and the ground plane 74 is large, and an amount of the energy leaking from the coupling element 71 to the ground plane 74 is reduced.

Further, when the dielectric 75 is arranged between the ground plane 74 and the coupling element 71, an electric field between the ground plane 74 and the coupling element 71 is concentrated onto a part where the dielectric 75 is sandwiched, and the energy is drawn to the ground plane 74 side. Thus, providing the notches 75a and 75b in the dielectric 75 enables avoiding the concentration of the electric field between the ground plane 74 and the coupling element 71. Furthermore, as a result, an amount of energy utilized for electromagnetic coupling with the coupler apparatus as a communication party increases, thereby improving a transmission coefficient (S21).

Figure 19:
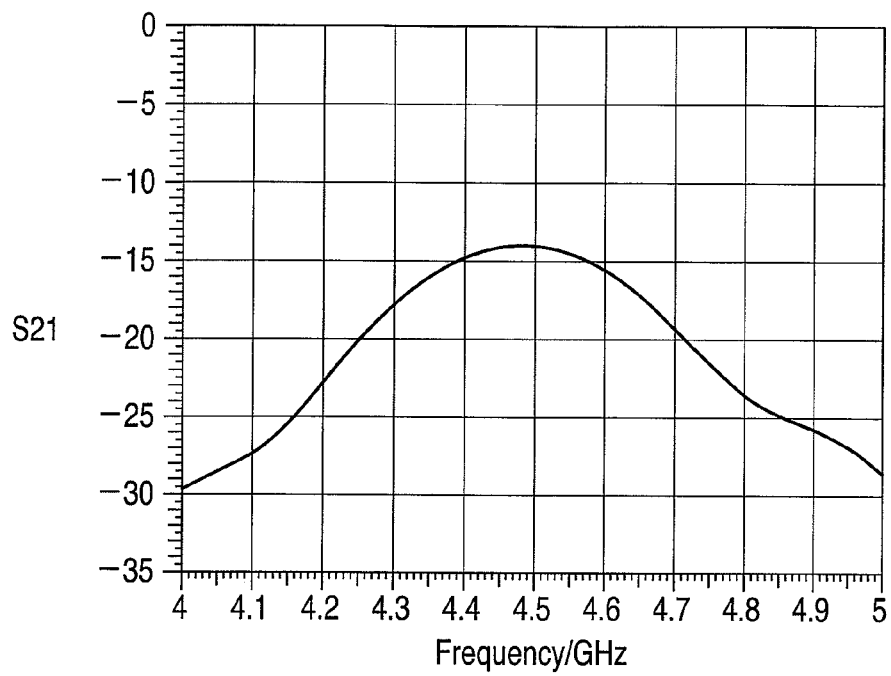
FIG. 19 is a view showing a relationship between a frequency and a transmission coefficient (S21)

FIG. 19 is a view showing a relationship between a frequency and a transmission coefficient (S21) under conditions that the two coupler apparatuses 7 face each other in the same state as that depicted in FIG. 8.

Figure 20:
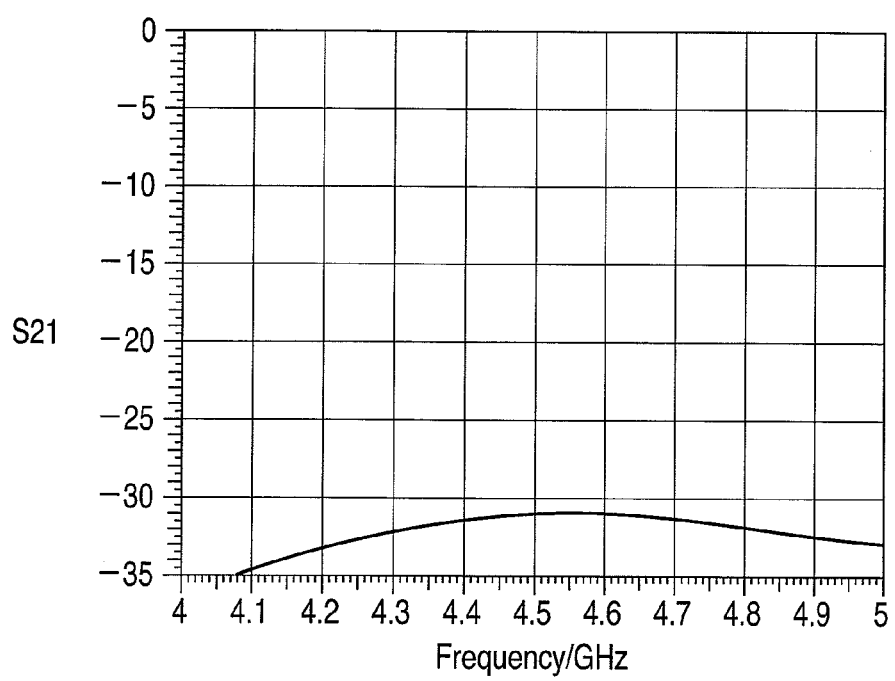
FIG. 20 is a view showing a relationship between a frequency and a transmission coefficient (S21)

FIG. 20 is a view showing a relationship between a frequency and a transmission coefficient (S21) under conditions that two coupler apparatuses according to a comparative example face each other in the same state as that depicted in FIG. 8. It is to be noted that in the coupler apparatus according to the comparative example, the ground plane 74 and the dielectric 75 in the coupler apparatus 7 are substituted by a ground plane and a dielectric that have simple tabular shapes with no notch formed therein.

As obvious from a comparison between FIG. 19 and FIG. 20, in the coupler apparatus 7, the transmission coefficient can be improved in the wider frequency range due to presence of the notches 74a, 74b, 75a, and 75b.

(Fifth Embodiment)

Figure 21:
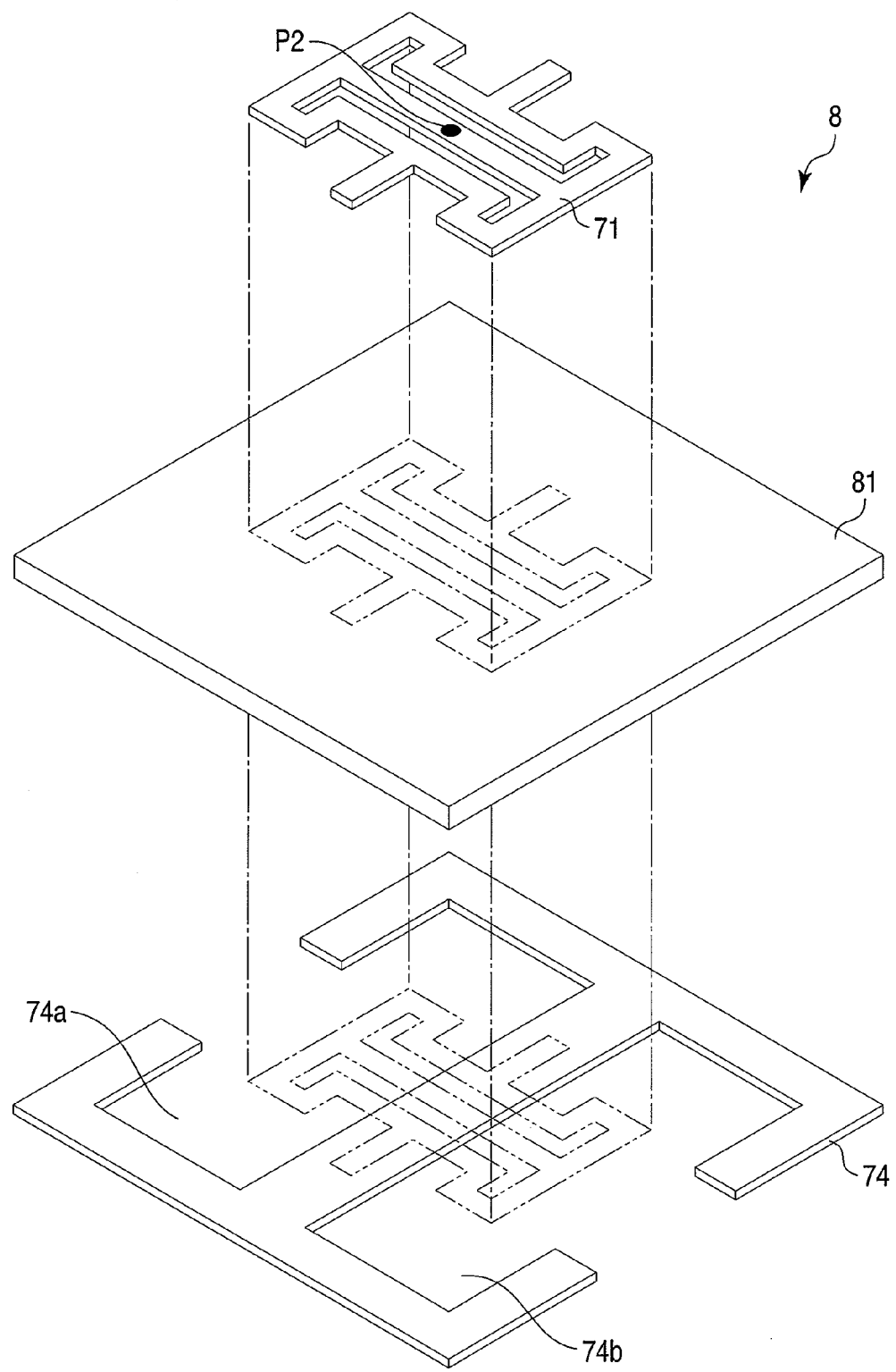
FIG. 21 is an exploded perspective view of a coupler apparatus according to a fifth embodiment.

FIG. 21 is an exploded perspective view of a coupler apparatus 8 according to a fifth embodiment. It is to be noted that, in FIG. 21, like reference numerals denote parts equal to those in FIG. 17 and FIG. 18 to omit a detailed description thereof.

As shown in FIG. 21, the coupler apparatus 8 includes a coupling element 71, a ground plane 74, and a dielectric 81. Furthermore, the coupler apparatus 8 also includes a feeder line 17 and a connector 18 such as shown in FIG. 1 to FIG. 5 and short elements 72 and 73 such as depicted in FIG. 17 but these members are omitted in FIG. 21. Moreover, FIG. 21 shows outline structures and a positional relationship of the coupling element 71, the ground plane 74, and the dielectric 81, but detailed illustration of the structures is omitted.

That is, the coupler apparatus 8 includes the dielectric 81 in place of the dielectric 75 in the coupler apparatus 7.

The dielectric 81 is a plate made of a dielectric material like the dielectric 75. However, the dielectric 81 is different from the dielectric 75 in that the dielectric 81 is formed with a simple tabular shape with no notch formed therein. The dielectric 81 is arranged like the dielectric 75.

Since notches 74a and 74b are formed even in this coupler apparatus 8, a distance between a current path in the coupling element 71 and the ground plane 74 is large, and an amount of energy leaking from the coupling element 71 to the ground plane 74 is reduced. Moreover, as a result, an amount of energy used for electromagnetic coupling is increased, and the performance of the coupling is improved.

FIG. 22 is a view showing a relationship between a frequency and a transmission coefficient (S21) under conditions that the two coupler apparatuses 8 face each other in the same state as that depicted in FIG. 8.

As obvious from a comparison between FIG. 20 and FIG. 22, in the coupler apparatus 8, the transmission coefficient is improved in the wide frequency range due to presence of the notches 74a and 74b.

(Sixth Embodiment)

Figure 23:
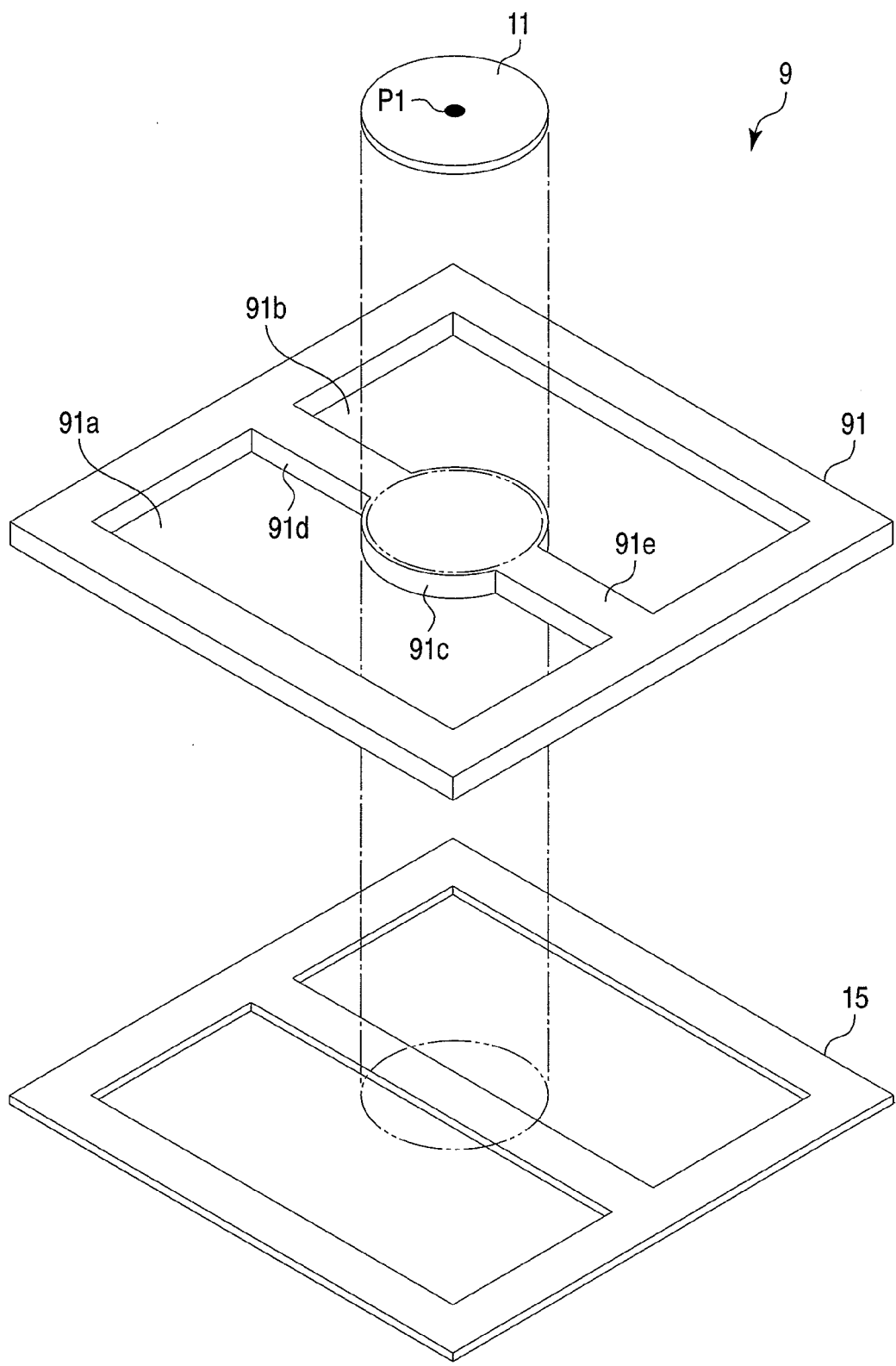
FIG. 23 is an exploded perspective view of a coupler apparatus according to a sixth embodiment.

FIG. 23 is an exploded perspective view of a coupler apparatus 9 according to a sixth embodiment. It is to be noted that like reference numerals denote parts equal to those in FIG. 1 to FIG. 5, thereby omitting a detailed description thereof.

As shown in FIG. 23, the coupler apparatus 9 includes a coupling element 11, a ground plane 15, and a dielectric 91. Additionally, the coupler apparatus 9 further includes a feeder line 17 and a connector 18 such as shown in FIG. 1 to FIG. 5, but these members are omitted in FIG. 23. Further, FIG. 23 shows outline structures and a positional relationship of the coupling element 11, the ground plane 15, and the dielectric 91, and detailed illustration of the structures is omitted.

That is, in the coupler apparatus 9, the parasitic element 12 and the short elements 13 and 14 in the coupler apparatus 1 are omitted, but the dielectric 91 is provided in place of the dielectric 16.

The dielectric 91 is a plate made of a dielectric material like the dielectric 16. The dielectric 91 has openings 91a and 91b. The openings 91a and 91b have shapes different from those of the openings 16a and 16b. That is, the openings 91a and 91b form a support portion 91c and crosspieces 91d and 91e. The support portion 91c is smaller than the support portion 16c, and the crosspieces 91d and 91e that support the coupling element 11 alone projected in opposite directions from the support portion 91c and are longer than the crosspieces 16d and 16e. A dielectric 52 is arranged like the dielectric 16.

Even in such a coupler apparatus 9, an amount of energy leaking from the coupling element 11 to the ground plane 15 is reduced. Further, as a result, an amount of energy used for electromagnetic coupling is increased, and the performance of the coupling is improved.

This embodiment can be modified in many ways as follows.

(1) In all the foregoing embodiments, the dielectrics 16, 61, 75, 81, and 91 can be omitted.

(2) The embodiment can be carried out as the coupler apparatus including the ground plane 51 in place of the ground plane 15 in the coupler apparatus 1 or 9.

(3) The embodiment can be carried out as the coupler apparatus including the ground plane 15 in place of the ground plane 51 in the coupler apparatus 5.

(4) The embodiment can be carried out as the coupler apparatus including the ground plane 15 in place of the ground plane 74 in the coupler apparatus 7 or 8.

(5) The embodiment can be carried out as the coupler apparatus including the dielectric 52 in place of the dielectric 91 in the coupler apparatus 9.

(6) The embodiment can be carried out as the coupler apparatus including the ground plane 51 in place of the ground plane 15 in the coupler apparatus 9 and also including the dielectric 52 in place of the dielectric 91.

(7) The embodiment can be carried out as the coupler apparatus having the configuration that the ground plane 51 is provided in place of the ground plane 15 in the coupler apparatus 9 and the openings 91*a* and 91*b* in the dielectric 91 extend to the end portions of the dielectric 91 and are opened to the outside of the dielectric 91 like the notches 61*a* and 61*b*.

(8) The coupling element 11 may have an arbitrary shape as long as it behaves as a monopole type element.

(9) The parasitic element 12 may have an arbitrary shape.

(10) The coupling element 71 may have an arbitrary shape as long as it behaves as a folded-dipole type element.

(11) The shapes of the notches 51*a*, 51*b*, 61*a*, 61*b*, 74*a*, 74*b*, 75*a*, 75*b*, 91*a*, and 91*b* can be arbitrarily changed. For example, in these shapes, a size can be changed, or a linear side can be partially changed to a curved shape.

(12) All the coupler apparatuses 1, 5, 6, 7, 8, and 9 in the foregoing embodiments are configured to include the feeding point and to be symmetrical with a plane parallel to the front-and-back direction at the center. However, such symmetrical properties are not fundamental, and these coupler apparatuses may be configured to asymmetrical with the plane at the center. However, providing the configuration of each of the foregoing embodiments is advantageous to improve the performance regarding to a rotation of the coupler apparatus beyond the asymmetrical configuration.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A coupler apparatus comprising:
    a monopole type coupling element comprising a conductive material and configured to receive power at a feeding point;
    a parasitic element comprising a conductive material, wherein the parasitic element is apart from the coupling element and grounded; and
    a ground plane comprising a conductive material facing the coupling element and facing the parasitic element,
    wherein the ground plane comprises a cut-out near a position facing at least a part of the coupling element other than the feeding point.

2. The apparatus of claim 1, wherein the cut-out in the ground plane extends to an end portion of the ground plane.

3. The apparatus of claim 1, further comprising a dielectric between the coupling element and the ground plane, the dielectric facing the coupling element and the ground plane.

4. The apparatus of claim 3, wherein the cut-out in the ground plane extends to an end portion of the ground plane.

5. The apparatus of claim 3, wherein the dielectric comprises a notch portion near a position facing the coupling element.

6. The apparatus of claim 5, wherein the cut-out in the ground plane extends to an end portion of the ground plane.

7. A coupler apparatus comprising:
    a folded-dipole type coupling element comprising a conductive material and configured to receive power at a feeding point, wherein the coupling element is grounded at a grounding point different from the feeding point; and
    a ground plane comprising a conductive material facing the coupling element,
    wherein the ground plane comprises a cut-out near a position facing at least a part of the coupling element other than the feeding point.

8. The apparatus of claim 7, wherein the cut-out in the ground plane extends to an end portion of the ground plane.

9. The apparatus of claim 7, further comprising a dielectric between the coupling element and the ground plane, the dielectric facing the coupling element and the ground plane.

10. The apparatus of claim 9, wherein the cut-out in the ground plane extends to an end portion of the ground plane.

11. The apparatus of claim 9, wherein the dielectric comprises a cut-out near a position facing at least a part of the coupling element other than the feeding point.

12. The apparatus of claim 11, wherein the cut-out in the ground plane extends to an end portion of the ground plane.

13. A coupler apparatus comprising:
    a monopole type coupling element comprising a conductive material and configured to receive power feeding at a feeding point;
    a ground plane comprising a conductive material and facing the coupling element,
    wherein the ground plane comprises a cut-out near a position facing at least a part of the coupling element other than the feeding point.

14. The apparatus of claim 13, wherein the cut-out in the ground plane extends to an end portion of the ground plane.

15. The apparatus of claim 13, further comprising a dielectric between the coupling element and the ground plane, the dielectric facing the coupling element and the ground plane.

16. The apparatus of claim 15, wherein the cut-out in the ground plane extends to an end portion of the ground plane.

17. The apparatus of claim 15, wherein the dielectric comprises a cut-out near a position facing at least a part of the coupling element other than the feeding point.

18. The apparatus of claim 17, wherein the cut-out in the ground plane extends to an end portion of the ground plane.

* * * * *